US009835885B2

(12) United States Patent
Reich et al.

(10) Patent No.: US 9,835,885 B2
(45) Date of Patent: Dec. 5, 2017

(54) SYSTEMS, METHODS, AND APPARATUS FOR SENSITIVE THERMAL IMAGING

(71) Applicants: Robert K. Reich, Tyngsborough, MA (US); Harry R. Clark, Townsend, MA (US); Carl O. Bozler, Waltham, MA (US); Shaun R. Berry, Chelmsford, MA (US); Jeremy B. Muldavin, Lawrence, MA (US)

(72) Inventors: Robert K. Reich, Tyngsborough, MA (US); Harry R. Clark, Townsend, MA (US); Carl O. Bozler, Waltham, MA (US); Shaun R. Berry, Chelmsford, MA (US); Jeremy B. Muldavin, Lawrence, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 188 days.

(21) Appl. No.: 14/845,941

(22) Filed: Sep. 4, 2015

(65) Prior Publication Data
US 2016/0070125 A1 Mar. 10, 2016

Related U.S. Application Data

(60) Provisional application No. 62/046,701, filed on Sep. 5, 2014.

(51) Int. Cl.
*G02F 1/13* (2006.01)
*H04N 5/33* (2006.01)
(Continued)

(52) U.S. Cl.
CPC ............... *G02F 1/132* (2013.01); *G01J 5/58* (2013.01); *H04N 5/33* (2013.01); *G02F 1/1337* (2013.01);
(Continued)

(58) Field of Classification Search
CPC .... G02F 1/132; G02F 1/1337; G02F 2203/11; G02F 2001/133638; G02F 1/13;
(Continued)

(56) References Cited

U.S. PATENT DOCUMENTS 3,471,235 A 10/1969 Van Vliet, Jr. et al.
3,723,739 A 3/1973 Horton
(Continued)

FOREIGN PATENT DOCUMENTS

EP 0138398 A 4/1985
GB 2171534 A 8/1986

OTHER PUBLICATIONS

Notification of Transmittal of the International Search Report and the Written Opinion of the International Searching Authority, or the Declaration in related PCT Application No. PCT/US2015/048550, filed Sep. 4, 2015, dated Jan. 6, 2016, 12 pages.
(Continued)

*Primary Examiner* — Zhihan Zhou
(74) *Attorney, Agent, or Firm* — Cooley LLP

(57) ABSTRACT

The high-pixel-count uncooled thermal imaging arrays disclosed herein have liquid crystal (LC) microcavity transducers separate from the read-out integrated circuit (ROIC). The transducer converts incident infrared (IR) radiation in birefringence changes that can be measured with visible light. In other words, the system uses the temperature sensitivity of the LC birefringence to convert the IR scene to a visible image. Measurements on sample arrays indicate that the LC material quality is similar to that of bulk samples and has good noise performance. Additionally, high-fill-factor arrays on fused-silica substrates may be processed to enable optimization of conditions for greatly improved temperature sensitivity. An additional IR absorber layer may be integrated into the process to tune the structure for the infrared.

12 Claims, 22 Drawing Sheets

(51) Int. Cl.
*G01J 5/58* (2006.01)
*G02F 1/1337* (2006.01)
*G02F 1/13363* (2006.01)

(52) U.S. Cl.
CPC ............ *G02F 2001/133638* (2013.01); *G02F 2203/11* (2013.01)

(58) Field of Classification Search
CPC ........... G02F 1/13363; G01J 5/58; G01J 5/08; H04N 5/33; H04N 5/331; H04N 5/374
USPC .......................................................... 348/164
See application file for complete search history.

(56) References Cited

U.S. PATENT DOCUMENTS

| | | | |
|---|---|---|---|
| 4,099,857 A | 7/1978 | Hareng et al. | |
| 4,594,507 A | 6/1986 | Elliott et al. | |
| 4,751,387 A | 6/1988 | Robillard | |
| 4,754,139 A | 6/1988 | Ennulat et al. | |
| 4,787,713 A | 11/1988 | Lu et al. | |
| 4,792,213 A | 12/1988 | Hilsum | |
| 4,994,672 A | 2/1991 | Cross et al. | |
| 5,124,827 A * | 6/1992 | Davey | G02F 1/1416 349/125 |
| 5,389,788 A | 2/1995 | Grinberg et al. | |
| 5,512,748 A | 4/1996 | Hanson | |
| 7,135,679 B2 | 11/2006 | Roman et al. | |
| 7,432,506 B2 | 10/2008 | Roman et al. | |
| 7,738,047 B2 | 6/2010 | Yelleswarapu et al. | |
| 7,764,324 B2 | 7/2010 | Andonian et al. | |
| 2004/0008348 A1* | 1/2004 | Kishikawa | G01J 4/04 356/364 |
| 2006/0226364 A1 | 10/2006 | Roman et al. | |
| 2008/0179519 A1 | 7/2008 | Andonian et al. | |
| 2008/0185503 A1* | 8/2008 | Ashley | G06T 5/50 250/216 |
| 2012/0188474 A1* | 7/2012 | Reich | G01J 5/58 349/22 |
| 2013/0242210 A1* | 9/2013 | Endo | G02F 1/1335 349/8 |
| 2014/0014811 A1 | 1/2014 | Zanger | |
| 2014/0043489 A1* | 2/2014 | Tidhar | H01L 27/1465 348/164 |

OTHER PUBLICATIONS

Andre Y. et al. "Infrared video camera at 10 μm", *Applied Optics*, vol. 18, No. 15, (Aug. 1, 1979), p. 2607-2608.

Bass, M. Editor, Handbook of Optics, Second Edition, vol. 2: Devices, Measurements, and Properties, McGraw Hill, Chapter 22, Polarimetry, (1995), 37 pages.

Biatinica M. et al., "(U) Uncooled IR Detectors for Air-To-Ground Missile Applications", *Critical Technology*, (Mar. 9, 2012), 14 pages.

Berreman, D. W., "Solid Surface Shape and the Alignment of an Adjacent NEMATIC Liquid Crystal," Physical Review Letters, vol. 28, No. 26, (1972), pp. 1683-1687.

Chaudhari, P. et al., "Atomic-Beam Alignment of Inorganic Materials for Liquid-Crystal Displays," Letters to Nature, vol. 411, (2001), pp. 86-89.

Chigrinov, V. G. et al., "Photoalignment of Liquid Crystalline Materials", John Wiley and Sons Ltd., SID Series in Display Technology, (2008), 240 pages.

Datskos P. et al. "Performance of uncooled microcantilever thermal detectors", *Review of Scientific Instruments*, vol. 75, No. 4, (Apr. 2004), 15 pages.

Delly, John Gustav, Senarmont Compensation: How to Accurately Measure Small Relative Retardations (O-1λ), Modern Microscopy, Jul. 5, 2003, 14 pages.

Ennulat, R.D. et al., "The Temperature Sensitivity of Selective Reflection by Cholesteric Mesophases and Its Possible Limitations", Molecular Crystals and Liquid Crystals, vol. 26, Issue 3-4, (1974), pp. 245-267.

Fester, William K. et al., "The de Senarmont Compensator", Microscopy Resource Center, Olympus Microscopy Resource Center, 2012, 3 pages (retrieved Aug. 21, 2015).

Hansen, J.R., et al., "Display of Infrared Laser Patterns by a Liquid Crystal Viewer," Applied Optics, vol. 3, No. 8, pp. 987-988 (1964).

Horn, S. et al., "Reaching for the Sensitivity Limits of Uncooled and Minimally Cooled Thermal and Photon Infrared Detectors," Proceedings of SPIE, vol. 5783, Infrared Technology and Applications XXXI, (2005), pp. 401-411.

Humphreys, R. G. et al., "An Optically Coupled Thermal Imager", Infrared Physics, vol. 28, No. 2, (1998), pp. 113-127.

Klick, D. et al., "WISP-360 Wide Area Imager using LWIR DFPA for Tower-based Persistent Surveillance," Proceedings of the Military Sensing Symposia, Passive Sensor, (2011).

Liu, W. et al., "Liquid Crystals for Optical Readout IR Imaging", Proc. of SPIE, vol. 7780, 6 pages.

Mori, M. et al. "Thin Organic Photoconductive Film Image Sensors with Extremely High Saturation of 8500 electrons/μm$^2$," Symposium on VLSI Technology Digest of Technical Papers, (2013), pp. T22-T23.

Orsay Group, "Dynamics of Fluctuations in Nematic Liquid Crystals," The Journal of Chemical Physics, vol. 51, No. 2, (1969), pp. 816-822.

Otani, Y., Handbook of Optical Metrology: Principles and Applications, Chapter 26: "Birefringence Measurement", Taylor and Francis Group, LLC, (2008), 26 pages.

Robbie, K. et al., "Chiral Nematic Order in Liquid Crystals Imposed by an Engineered Inorganic Nanostructure," Letters to Nature, vol. 399, (1999), pp. 764-766 (1999).

Skidmore G. et al., "(U) Status of Uncooled Detectors and Camera Systems at DRS", *Critical Technology*, (Mar. 2, 2011), 9 pages.

Wagner M. et al., "Solid State Optical Thermal Imagers", *Proc. of SPIE*, vol. 6542, (2007), p. 65421P-1-65421P-10.

* cited by examiner

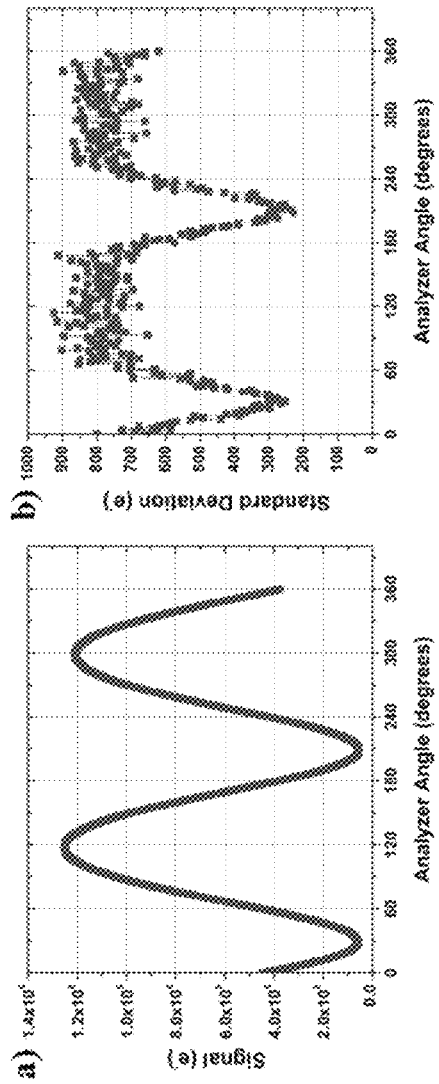
FIG. 2A
FIG. 2B
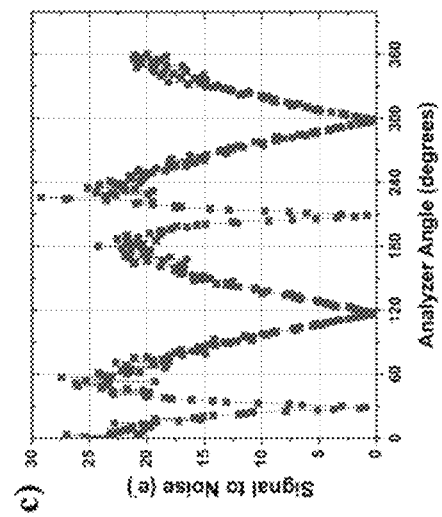
FIG. 2C

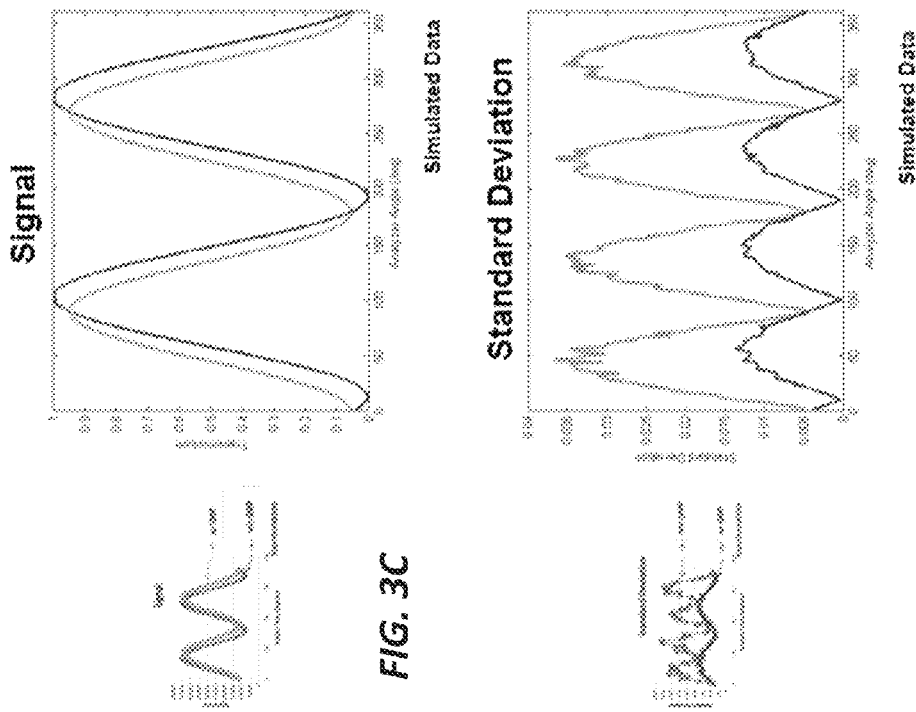
FIG. 3C
FIG. 3D
- Is the pattern in the noise due to the liquid crystal?
  YES
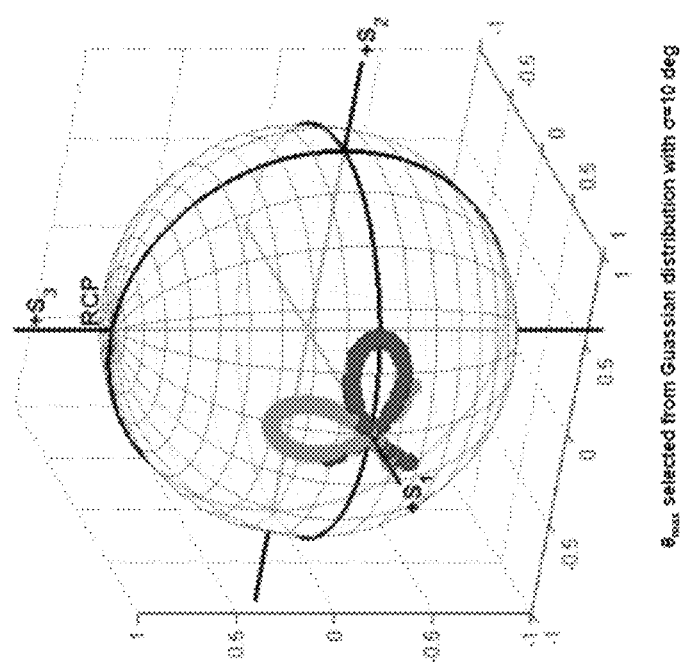
FIG. 3B

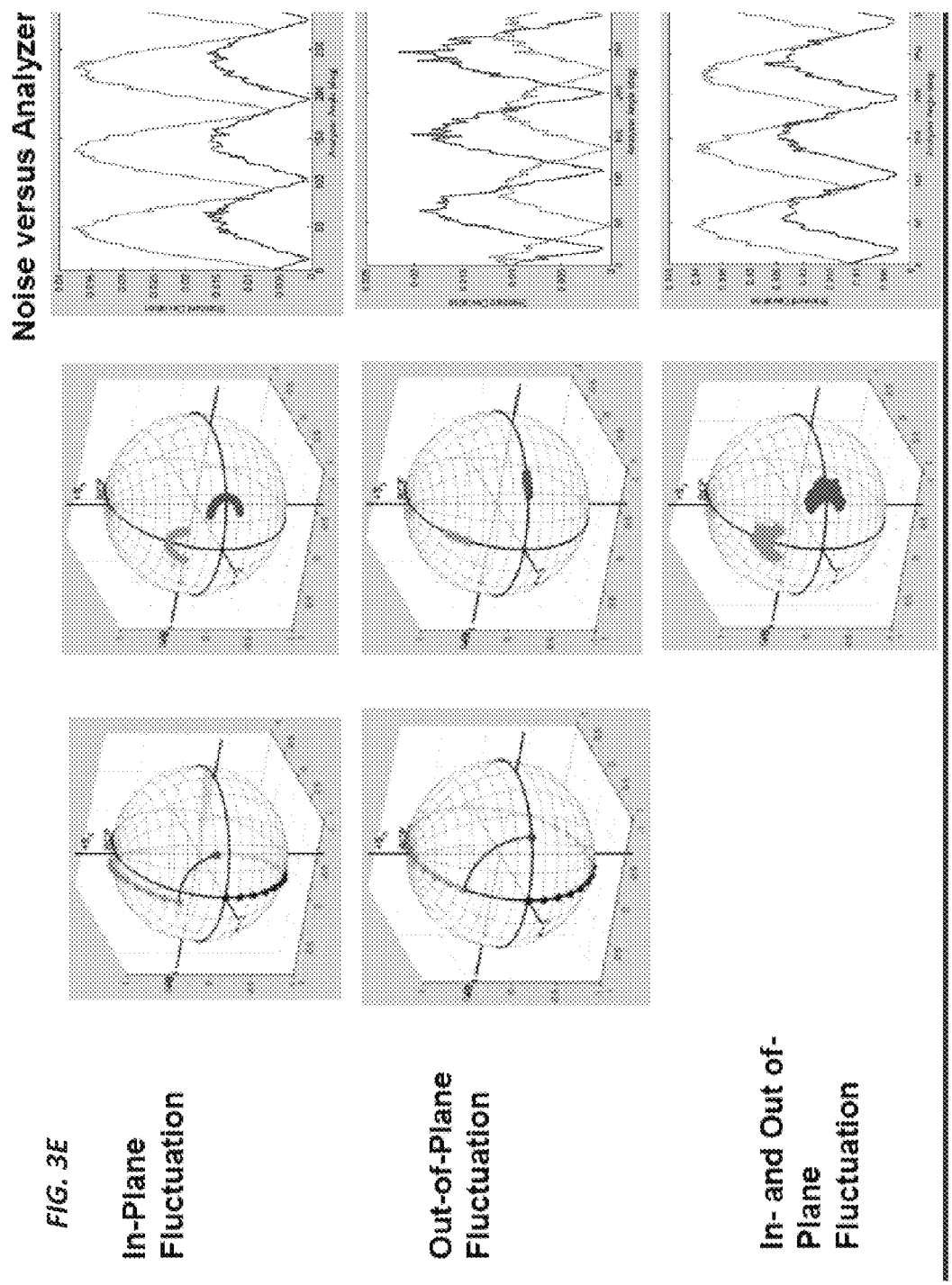

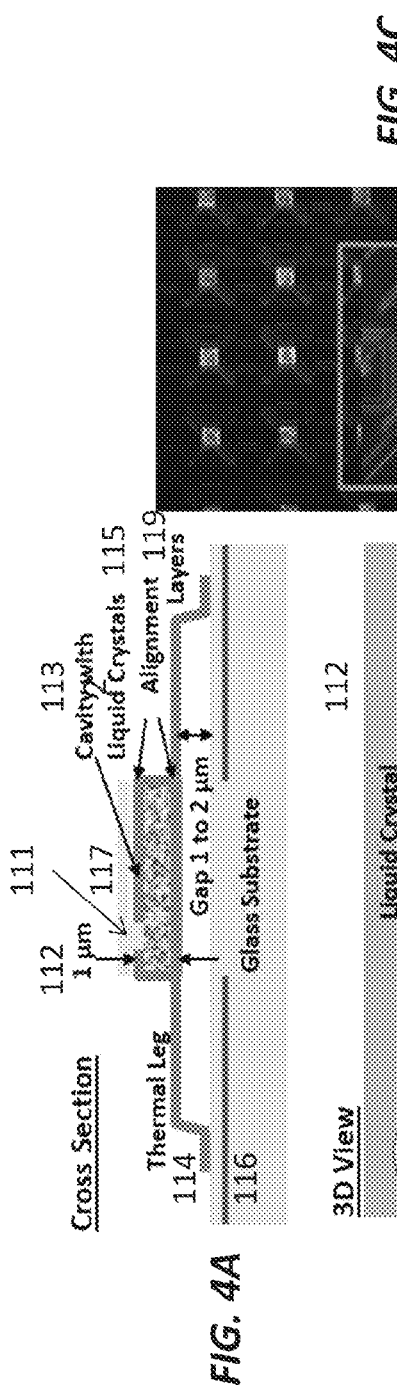
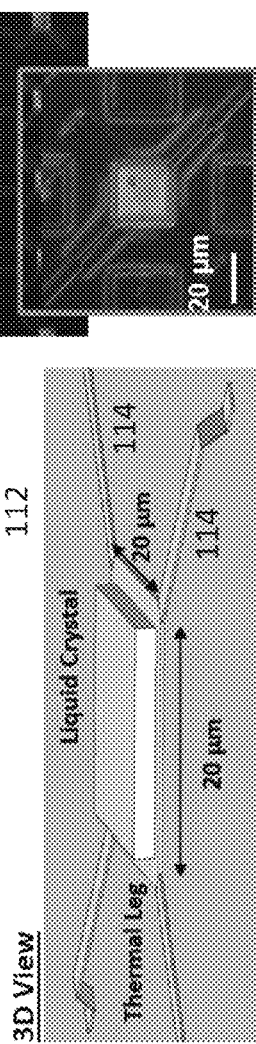
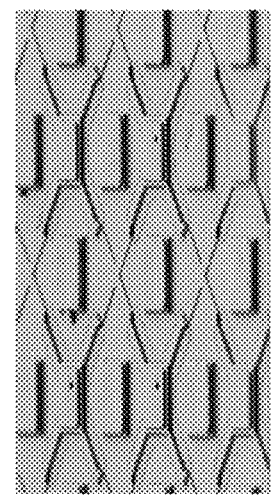
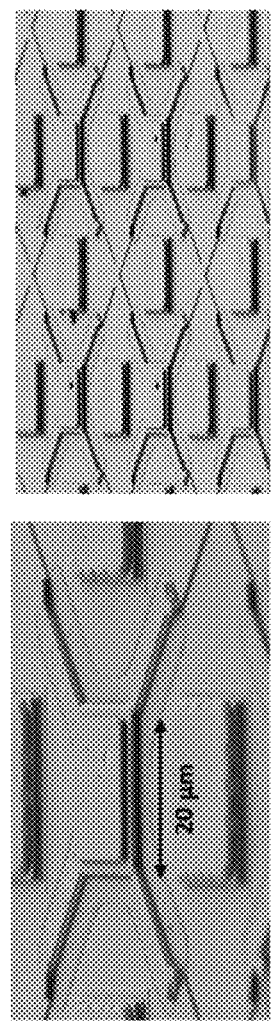
FIG. 4A  FIG. 4B  FIG. 4C  FIG. 4D  FIG. 4E

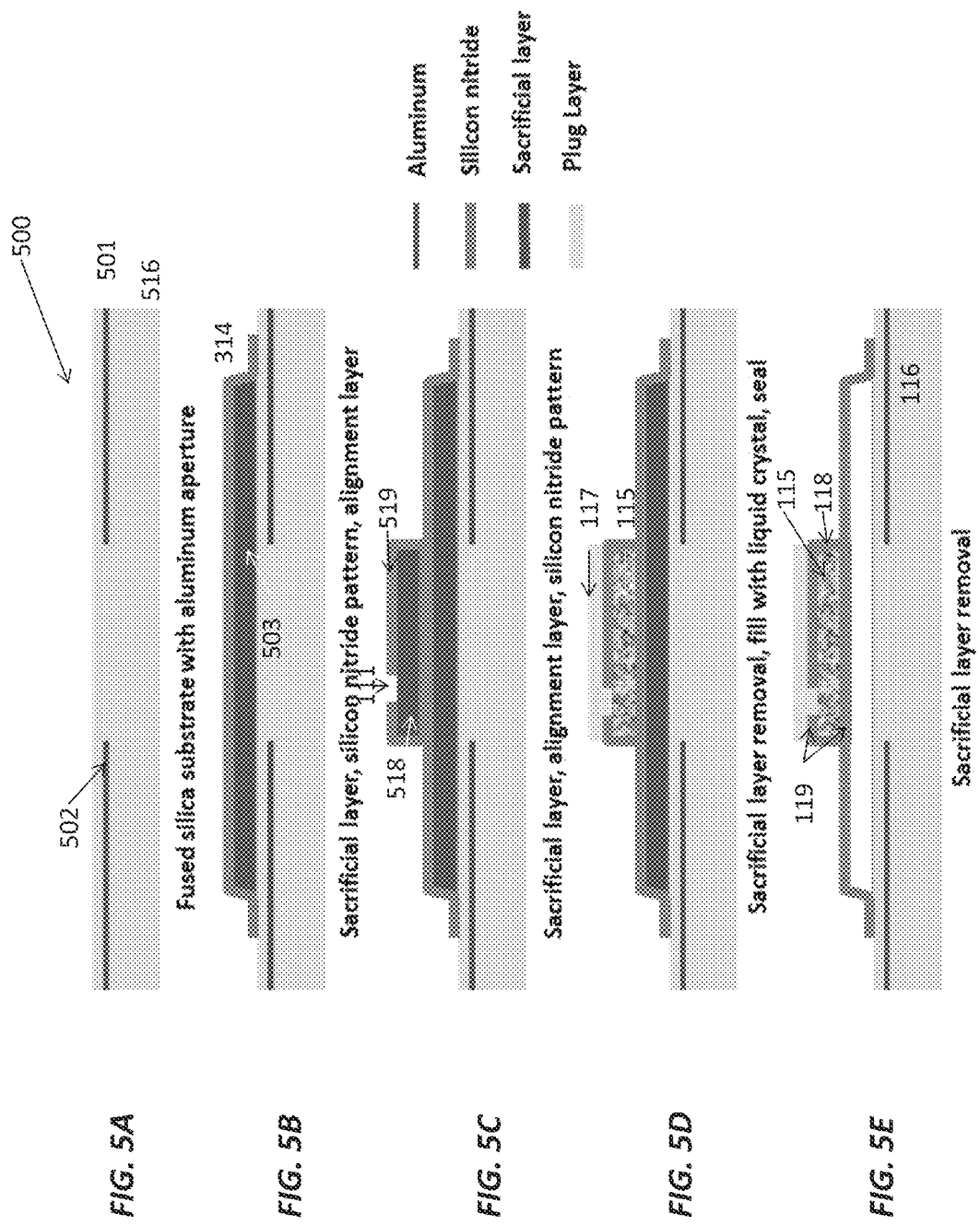

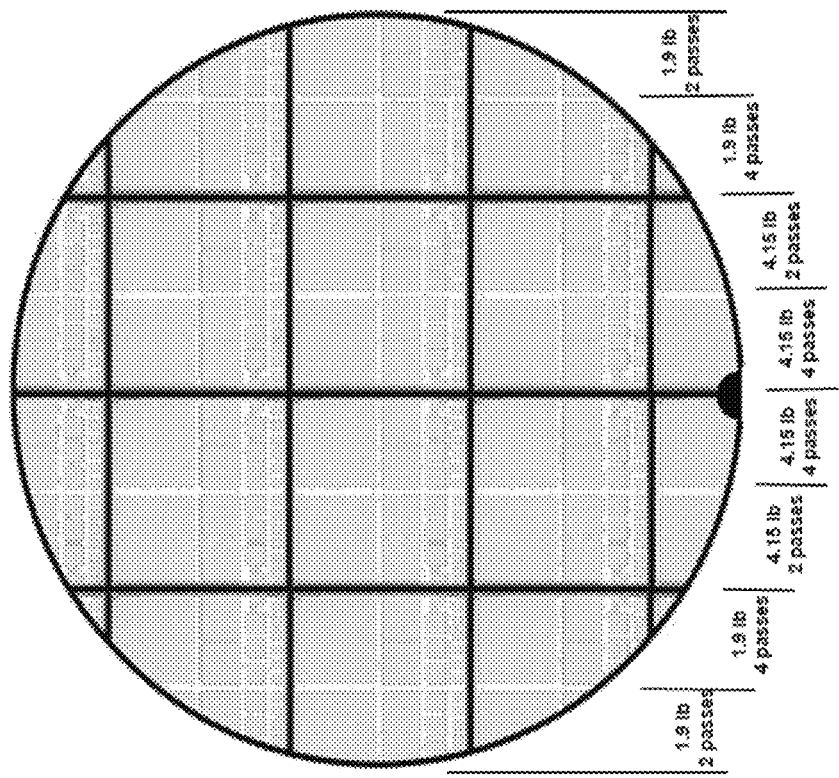
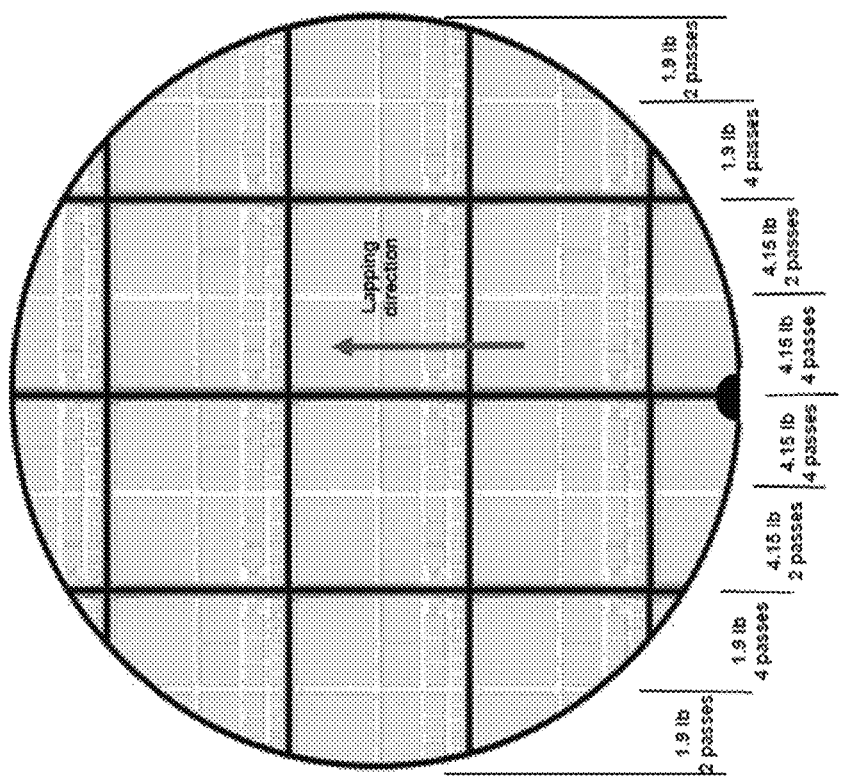
FIG. 8A
FIG. 8B

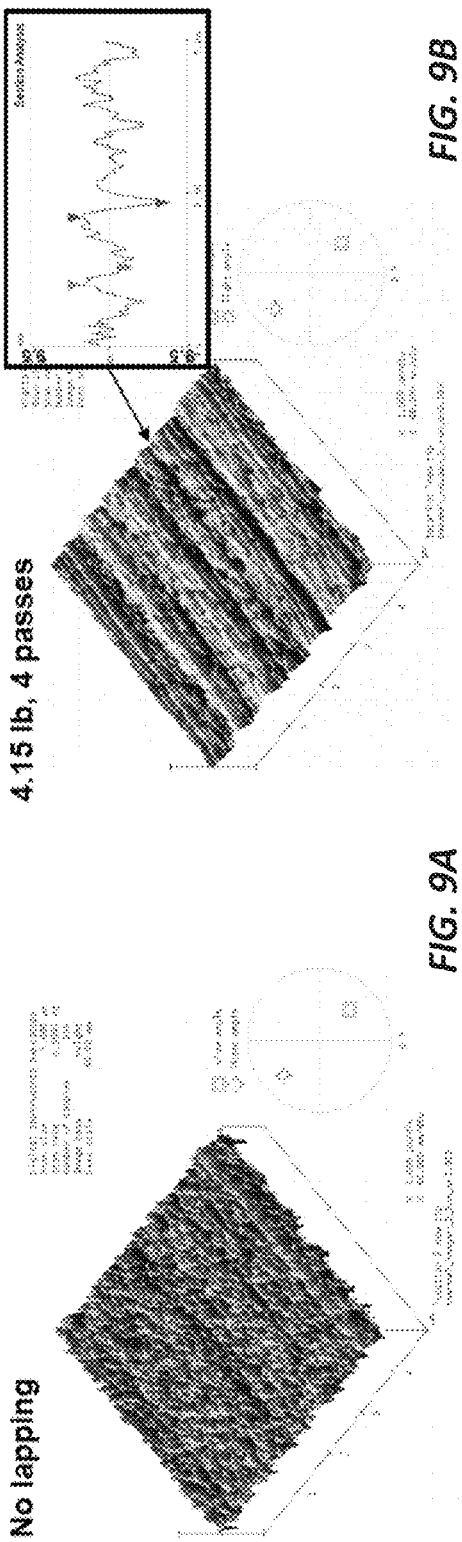
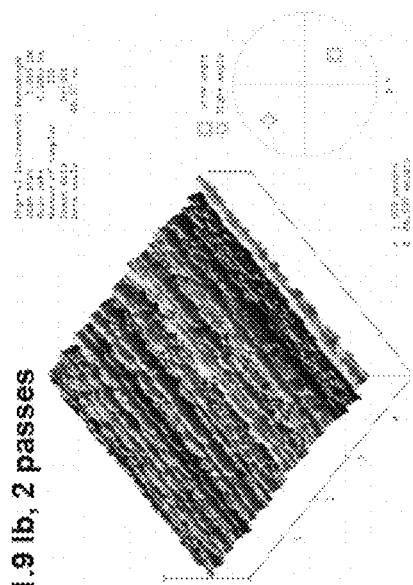
FIG. 9B
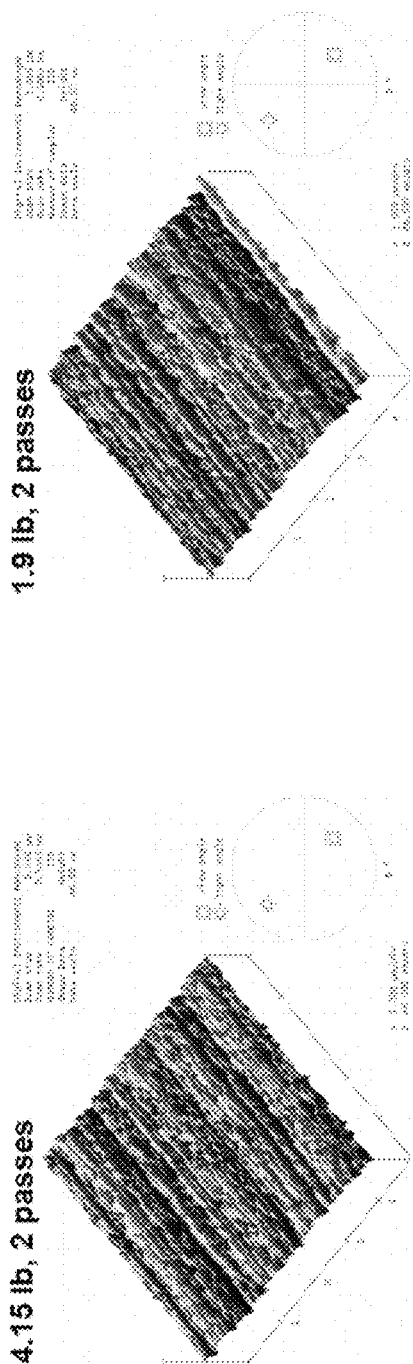
FIG. 9D
FIG. 9A
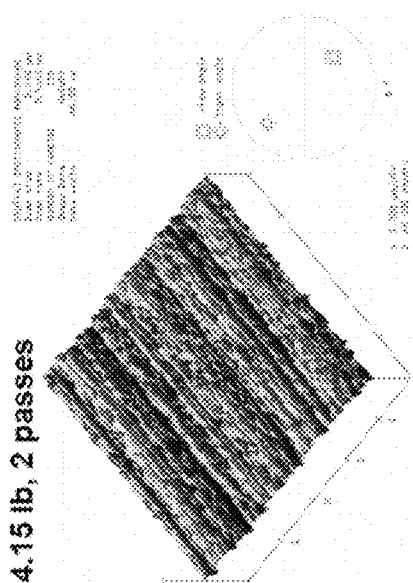
FIG. 9C

Twist  Bend  Splay

SYSTEMS, METHODS, AND APPARATUS FOR SENSITIVE THERMAL IMAGING

CROSS-REFERENCE TO RELATED APPLICATION(S)

This application claims priority, under 35 U.S.C. §119(e), from U.S. Application No. 62/046,701, filed Sep. 5, 2014, and entitled "Systems, Methods, and Apparatus for Sensitive Thermal Imaging," which application is hereby incorporated herein by reference in its entirety.

GOVERNMENT SUPPORT

This invention was made with Government support under Contract No. FA8721-05-C-0002 awarded by the U.S. Air Force. The Government has certain rights in the invention.

BACKGROUND

Uncooled thermal detectors have become an indispensable sensor technology in long-wavelength infrared (LWIR; 8 to 14 µm) imaging applications. Uncooled thermal detectors have sensitivity and resolution sufficient to replace cooled detectors in many applications. However, the state-of-the-art uncooled sensor technology, namely, microbolometers that sense the temperature by measuring a voltage on a thermistor, has progressed slowly over the past few years. Uncooled bolometers are limited in format (e.g., <3M pixel) and sensitivity. And microbolometers are based on thermistors whose resolution and sensitivity has improved slowly over the past few years. In addition, bolometers generally require complex fabrication methods and tend to be very expensive. For example, the support legs of a typical microbolometer structure are both thermally insulating and electrically conductive, which limits achievable thermal resistance. These constraints negatively impacts material selection, pixel size, fabrication complexity, yield, and performance.

Liquid crystal (LC)-based detectors have been investigated for uncooled thermal imaging since the 1970s. A liquid crystal thermal imager senses temperature by measuring the change in visible light flux through or reflected by a liquid crystal cell caused by changes in the state of the liquid crystal birefringence with temperature. As the liquid crystal cell changes temperature, its birefringence changes, which in turn causes a change in the polarization state of the incident visible light. Transmitting the visible light through a polarizer (aka an analyzer) transforms the change in the polarization state into an intensity change that can be measured with a conventional visible light detector, such as a charge-coupled device (CCD) or complementary metal-oxide-semiconductor (CMOS) array. A sensitive liquid crystal thermal image can detect small changes in temperature in the scene (e.g., 30 mK with a pixel size of about 17 µm, an f/1 lens, and a frame rate of 30 Hz) which is synonymous with being able to detect small changes in the infrared light flux.

Liquid crystals have a relatively large change in birefringence with temperature (high sensitivity), easily adjusted composition (e.g., properties such as time response, birefringence, and noise can be modified by synthesizing different types of liquid crystals), and can leverage an extensive manufacturing base created for displays. To date, however, LC-based detectors have not been successfully integrated into a detector array that has good response in the LWIR region of the electromagnetic spectrum. The difficulties include fabricating small pixels and filling them with liquid crystals. In addition, the liquid crystals themselves tend to be noisy, which degrades detector performance.

SUMMARY

Embodiments of the present invention include liquid crystal thermal imagers and methods of thermal imaging using liquid crystal that address the noise caused by undesired twisting, bending, and splaying of the liquid crystals. In one example, a thermal imaging system includes a liquid crystal transducer, a visible light source in optical communication with the liquid crystal transducer, a quarter-wave plate in optical communication with the liquid crystal transducer, an analyzer in optical communication with the quarter-wave plate, and a detector array in optical communication with the analyzer. The liquid crystal transducer has a birefringence $\Gamma$ that varies as a function of the incident infrared radiation, which may be about 2 µm to about 14 µm.

In operation, the visible light source illuminates the liquid crystal transducer with a first beam of linearly polarized visible light so as to produce a beam of elliptically polarized visible light having a degree of ellipticity that varies in proportion to the birefringence of the array of liquid crystal cells. The first beam of linearly polarized light has a polarization angle of 45° with respect to a fast axis of the liquid crystal transducer. The quarter-wave plate, which has an optical axis aligned with the polarization angle of the first beam of linearly polarized light, converts the beam of elliptically polarized visible light into a second beam of linearly polarized visible light. The analyzer polarizes the second beam of linearly polarized visible at an angle based on the birefringence $\Gamma$ of the liquid crystal transducer. And the detector array produces an electronic representation of the incident infrared radiation in response to detection of the second beam of linearly polarized visible light.

The analyzer angle may also be based on the signal-to-noise ratio (SNR). For example, the starting analyzer angle may be selected by measuring the SNR and finding the maximum empirically. The analyzer angle setting depends on the wavelength, detector noise, and liquid crystal noise.

Additional embodiments include a method for fabricating a liquid crystal cell. Such a method may comprise defining a first inner surface of the liquid crystal cell with a first inorganic layer. The first inner surface is textured to provide a first alignment surface for aligning liquid crystal material with respect to the first inorganic layer. A sacrificial layer is deposited on the first inner surface, and a surface of the sacrificial layer is textured to form a negative alignment surface. A second inorganic layer is deposited on the negative alignment surface to form a second alignment surface for aligning the liquid crystal material with respect to the second inner surface. A hole is formed in the second inorganic layer, and the sacrificial layer is removed via the hole. The liquid crystal material is disposed in the liquid crystal cell via the hole. And the hole is sealed to yield a liquid crystal cell containing the liquid crystal material aligned with respect to the first alignment surface and the second alignment surface.

Yet another embodiment includes a liquid crystal transducer that comprises a substrate, an array of liquid crystal cells, and a plurality of thermal legs. Each liquid crystal cell in the array of liquid crystal cells comprises a first textured inner surface, a second textured inner surface opposite the first textured inner surface, and liquid crystal material (which may have a thickness of less than about 2 µm) disposed between and aligned with the first textured inner surface and the second textured inner surface. And each thermal leg in the plurality of thermal legs is in physical contact with the substrate and with a respective liquid crystal cell in the array of liquid crystal cells to support the respective liquid crystal cell and to thermally isolate the respective liquid crystal cell from the substrate.

Yet another embodiment includes a method for thermal imaging of a scene. Long-wave infrared (LWIR) radiation representative of the scene is imaged onto at least one liquid crystal transducer so as to vary a birefringence of the at least one liquid crystal transducer by an amount proportional to an intensity of the LWIR radiation. The liquid crystal transducer is illuminated with polarized light so as to vary a polarization state of the polarized light by an amount proportional to the birefringence of the liquid crystal transducer. The polarized light is transmitted through a quarter-wave plate so as to transform the polarization state of the polarized light to a linear polarization state having a rotation angle proportional to the birefringence of the at least one liquid crystal transducer. The polarized light is transmitted through a linear polarizer to reduce an amplitude of the polarized light by an amount proportional to the birefringence of the at least one liquid crystal transducer. And the polarized light transmitted through the linear polarizer is detected to form a representation of the scene proportional to the intensity of the LWIR radiation.

A further embodiment includes a liquid crystal transducer with a substrate, a liquid crystal cell defining at least one sealed cavity, a thermal leg in physical contact with the substrate and the liquid crystal cell, liquid crystal material disposed within the sealed cavity, and an alignment layer disposed on at least one interior surface of the sealed cavity. The thermal leg supports the liquid crystal cell and thermally isolates the liquid crystal cell with respect to the substrate. The liquid crystal material varies a birefringence of the liquid crystal cell in response to a change in temperature. The alignment layer aligns the liquid crystal material with respect to the interior surface of the at least one sealed cavity.

Still another embodiment includes a photolithographic method for fabricating a liquid crystal transducer. In one example, this method comprises forming a first silicon dioxide layer on a substrate. A first sacrificial layer is deposited on top of the silicon dioxide layer and a first silicon nitride layer is deposited on top of the first sacrificial layer to form at least one thermal leg and a first surface of a liquid crystal cavity. A second silicon dioxide layer is deposited onto the first silicon nitride layer. A first alignment surface is formed on the first silicon dioxide layer. A second sacrificial layer is deposited on the first alignment surface. A second alignment layer is formed on the second sacrificial layer. A second silicon nitride layer is deposited on the second alignment layer to form a second surface and sides of the liquid crystal cavity. A hole is formed in the second silicon nitride layer. The second sacrificial layer is removed via the hole. Liquid crystal material in the liquid crystal cavity via the hole. And the first sacrificial layer is removed.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A is a plot of measured signal amplitude versus analyzer rotation angle for circularly polarized light incident on a Sénarmont compensator.

FIG. 2B is a plot of the standard deviation of the signal amplitude shown in FIG. 2A.

FIG. 2C is a plot of the signal-to-noise ratio (SNR) versus analyzer rotation angle for the signal plotted shown in FIG. 2A.

FIG. 3B shows liquid crystal twist noise on the Poincaré sphere with and without the quarter-wave plate.

FIG. 3C is a plot of simulated signal amplitude versus analyzer rotation angle with and without the quarter-wave plate.

FIG. 3D is a plot of the standard deviation of the signal amplitude shown in FIG. 3C.

FIG. 3E shows propagation of the signal on the Poincaré sphere and the simulated noise before and after the quarter-wave plate.

FIG. 4A is an illustration of a cross-section of a LC sensing element (pixel) suitable for use in the thermal imaging system shown in FIG. 1.

FIG. 4B is a perspective view of the pixel shown in FIG. 4A.

FIG. 4C is view of several liquid crystal pixels viewed with polarized light

FIGS. 4D and 4E are scanning electron microscope (SEM) photographs of a thermal pixel and arrays.

FIGS. 5A-5E show process steps in fabricating pixels in a liquid thermal imager.

FIGS. 8A and 8B shows a wafer lapping map with different pressures and different numbers of passes to create scratches, grooves, or alignment features.

FIG. 9A is an SEM photograph of a molybdenum layer with no lapping.

FIG. 9B is an SEM photograph of a molybdenum layer after four passes of lapping with 500 nm diamond film at a pressure of 4.15 psi.

FIG. 9C is an SEM photograph of a molybdenum layer after two passes of lapping with 500 nm diamond film at a pressure of 4.15 psi.

FIG. 9D is an SEM photograph of a molybdenum layer after four passes of lapping with 500 nm diamond film at a pressure of 1.9 psi.

DETAILED DESCRIPTION

Figure 1A:
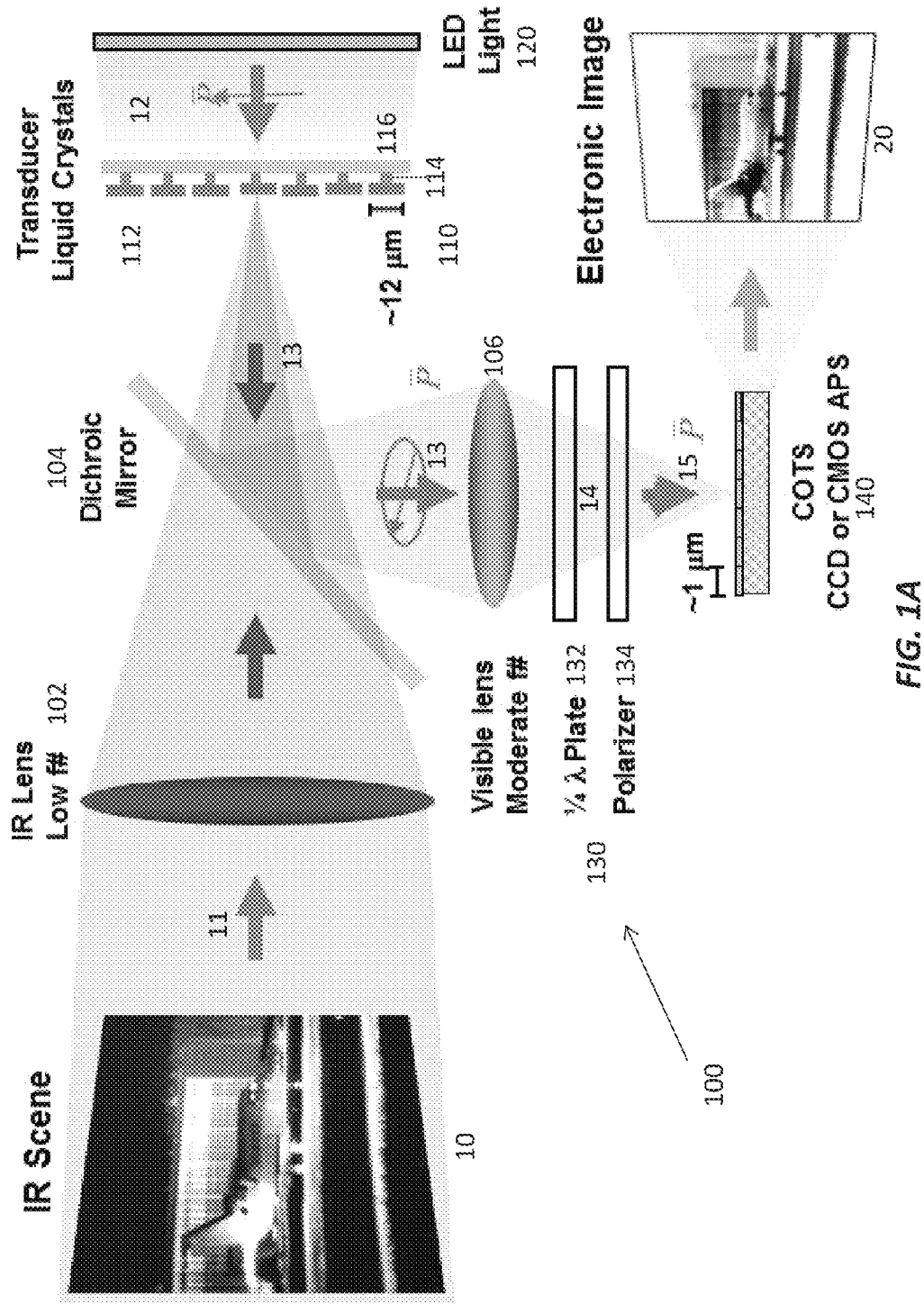
FIG. 1A shows a system for thermal imaging based on temperature sensitive LCs.

The liquid crystal thermal imagers disclosed herein use Sénarmont compensators to reduce liquid crystal noise for improved performance sensitivity and/or signal-to-noise ratio (SNR). More specifically, a liquid crystal thermal imager includes a liquid crystal transducer that transforms linearly polarized light into elliptically polarized light, which the Sénarmont compensator transforms into linearly polarized light that is detected with the CMOS or CCD array. By changing the polarization state of the visible light, the Sénarmont compensator reduces the effects of twist, bend, and/or splay noise in the liquid crystals.

In some cases, the noise compensation can be good enough that the liquid crystal thermal imager operates with a noise equivalent temperature difference (NETD) near room-temperature background-limited infrared performance (BLIP), which is about 10 times better than the that of the best commercially available devices. As understood by those of skill in the art, the noise equivalent temperature difference (NETD) is that change in scene temperature where the signal change to noise ratio is 1. The noise is measured or calculated from the fluctuations in the detector (imager) and this is converted into an equivalent temperature fluctuation. (The parameter that relates the system fluctuation variable (e.g. voltage, current, etc.) to temperature is called the responsivity.) A change in the image scene temperature that equals this noise is defined as the NETD. The noise is often stated as noise equivalent power (NEP) at the focal plane array (not the scene) since this does not concern system parameters (e.g., lens f#, blackbody wavelength bandwidth, exposure time). The NEP gives the scene NETD by using the system parameters.

The liquid crystal transducer includes an array of tens to thousands of thermally isolated cavities, or pixels, that can contain as little of 4 picoliters of liquid crystal each. Because of the low noise characteristic, the pixels can be scaled down in size (e.g., to about 6 μm), unlike bolometer pixels, which tend to get noisier as they are scaled down. This array can be fabricated using processes that involve texturing, lapping, or scratching the pixels' interior surfaces to provide alignment features for the liquid crystal material. The fabrication process may include fewer mask levels (e.g., 8 mask levels as opposed to 40 or more masks used to fabricate thermistor microbolometers) and is therefore very low cost. In addition, the fabrication process can be used to make uniform arrays with relatively close pixel packing that have far higher pixel counts than those used in bolometers, which translates to wider field of view and/or higher resolution for the imager.

For BLIP-limited noise, the noise is dominated by the incoming light shot noise. Without being bound by any particular theory, the noise cannot be lower than the noise associated with the light signal. It assumes parasitic light coming from all other surface is negligible (i.e. cold shielding is necessary and the detector must be cooler than the image scene. For background-limited noise performance, the signal to noise ratio (SNR) is 1. Once the noise is known it would take a signal of the same magnitude to get an SNR of 1. Without being bound by any particular theory, a thermal detector generally cannot reach BLIP because it and the uncooled surfaces radiate significant light that also has shot noise.

Applications for liquid crystal thermal images include, but are not limited to firefighting, night vision for automobiles, airplane landing and takeoff, energy audits, breast cancer detection, search and rescue, and surveillance (e.g., in security cameras). For example, a liquid crystal thermal imager can be used in home surveillance, medical triage, instant body temperature monitoring to check for health issues, night vision for traveling at night or for traveling anywhere in a car, foot, bike or otherwise (e.g., as a companion to a Global Positioning System receiver).

Order, Twist, Splay, and Bend Noise in Liquid Crystals

To understand thermal imager operation, some background in liquid crystal materials is helpful. As understood by those of ordinary skill in the art, liquid crystal materials are a state of matter that is distinct from the usual solid, liquid, and gas states. Nematic liquid crystal materials tend to have elongated, uniaxial molecules (e.g., with a pencil shape) with ordinary and extraordinary indices of refraction. That is, a nematic liquid crystal material has the extraordinary index of refraction $n_e$ for light polarized along the long axis of the averaged molecular orientation and the ordinary index of refraction $n_o$ along the other two orthogonal directions. The birefringence is the difference between the two indices, $\Delta n = n_e - n_o$. The interest in liquid crystal materials as optical detectors is in their relatively high birefringence $\Delta n$, which can be greater than 0.6.

For the liquid crystal state of matter (in this case nematic), the elongated axis of the molecule has a tendency to be aligned, but the center of mass of the molecules is free to move about as a liquid. Unlike a solid, the ordering of the long molecular axis is not perfect. The principal axis of the molecules thermally fluctuates about an average direction called the "director."

Figure 15:
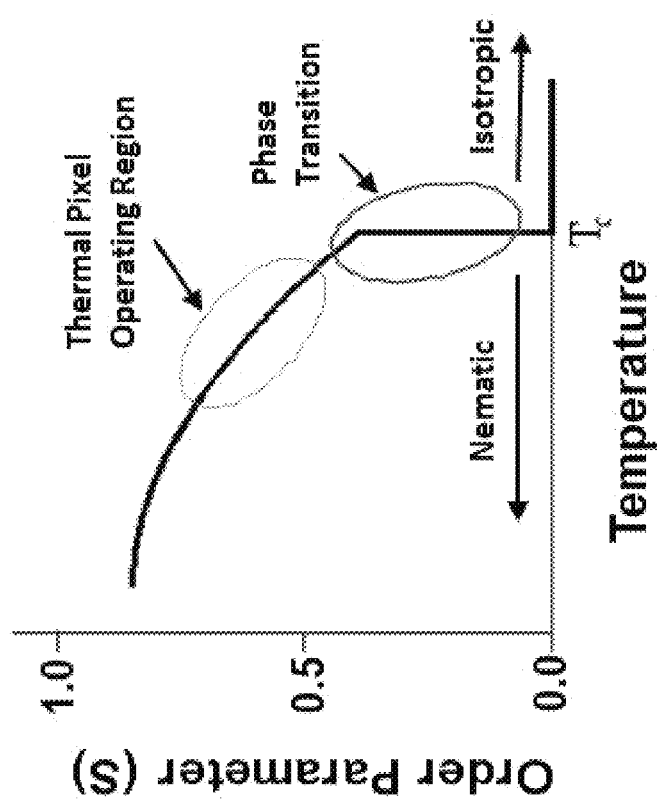
FIG. 15 is a graph of the order parameter (S) versus temperature for nematic liquid crystal material.

FIG. 15 is a plot of the degree of order, or order parameter, of the thermally fluctuating liquid crystal molecules. The order parameter is defined as $S = \langle 3/2 \cos^2 \theta - 1/2 \rangle$, where $\theta$ is the angle of the molecular axis with respect to the director axis. The birefringence, $\Delta n$, is proportional to the order parameter S and has the same temperature dependence as the order parameter. FIG. 15 shows that operating the thermal imager at temperatures below the phase transition between the nematic and isotropic phases produces a roughly linear change in order parameter (and hence in birefringence) with temperature.

The thermal imager arrays disclosed herein exploit the change in the order parameter with temperature, which in turn causes a change in the birefringence. (In contrast, liquid crystal displays are designed to have order parameters that do not change substantially with temperature.) As well understood in the art of optics, the two different indices of refraction cause the electromagnetic fields to travel as two modes with different velocities. This results in a phase change between the two electromagnetic modes and a change in the polarization state. This effect can be used to change the light transmission of the device between polarizers. Therefore: a change in temperature causes a change in the birefringence (difference in the indices of refraction) and thus in the polarization state and subsequent intensity of light transmitted through an analyzer.

The dependence of birefringence on liquid crystal order parameter is different from the electro-optical effect in display devices where the "effective" birefringence is varied by changing the angle between the light propagation direction and the averaged molecular orientation. In the case of the thermal imagers disclosed herein, the change in birefringence with temperature is related to a change in the molecular level order rather than changes in bulk properties like viscosity or elasticity.

Figures 16A, 16B, 16C:
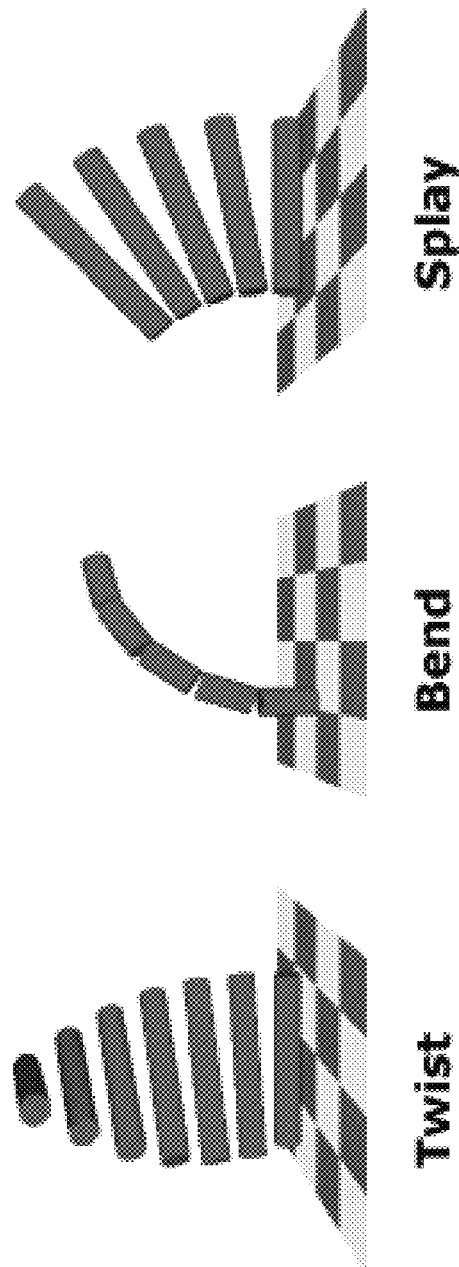
FIGS. 16A-16C illustrate twist, bend, and splay in a liquid crystal material aligned to a surface.

Unfortunately, the orientation of the liquid crystal molecules may vary or deform for reasons other than temperature-induced changes in order parameter. Random, undesired deformation of the liquid crystal molecules are typically classified as twist, bend, or splay as shown in FIGS. 16A, 16B, and 16C, respectively. Undesired twist, bend, or splay of the liquid crystal material varies the birefringence experienced by light propagating through the liquid crystal material, which can in turn degrade the thermal imager signal. In other words, undesired twist, bend, and splay of the liquid crystal material adds noise to the thermal imager signal. This noise can be quite large especially near the phase transition from a (nematic) liquid crystal state to an isotropic liquid state, which is near the operating range shown in FIG. 15.

The severity of twist, bend, and splay noise depends in part on the thickness of the liquid crystal layer. A thinner liquid crystal layers suppresses the liquid crystal director fluctuations. As the layer thickness increases, the noise caused by the director fluctuation increases super-linearly whereas the signal increases linearly (to increase the signal on the thinner layer, a resonant cavity can be used, but is not necessarily needed if the visible probing light is high enough to get good sensitivity).

The variation of twist, bend, and splay noise with liquid crystal thickness has been verified experimentally. In one example, the noise of a 3-μm thick cell was compared to a 6-μm thick cell. As expected, the noise in the 6-μm thick cell was up to four times higher than the noise in the 3-μm thick cell, whereas the signal strength was only twice as high. Without being bound to any particular theory, this result suggests that thicker liquid crystal layers tend to be noisier and have lower signal-to-noise ratios (SNRs) than thinner liquid crystal layers.

An Example Uncooled Liquid Crystal Thermal Imager

FIG. 1A shows a liquid crystal thermal imager 100 that includes a liquid crystal transducer 110 that is optically coupled to a Sénarmont compensator 130. The liquid crystal thermal imager 100 also includes an infrared (IR) lens 102 (e.g., with an F# of 0.8, 1.0, or greater), a dichroic mirror 104, a visible lens 106, a visible light source 120 (e.g., one or more light-emitting diodes (LEDs)), and a solid-state imager 140 that detects visible light (e.g., a CCD or CMOS active pixel sensor). Because the liquid crystal transducer 110 is separate from the solid-state imager 140, the liquid crystal transducer 110 can be better optimized for detecting the infrared signal.

The thermal imager 100 tracks fluctuations in the birefringence of the liquid crystal material as a proxy for temperature of the scene 10. As explained above, the birefringence of the liquid crystal material depends on the liquid crystal order parameter, which is a measured of the degree of order among the liquid crystal molecules. Using the order parameter magnitude has implications for speed as well as sensitivity. In particular, measuring the change in the liquid crystal birefringence yields a faster, more sensitive response than measuring the global change in the index of refraction (e.g., as in interference detection) or thermotropic color changes (e.g., as in twisted cholesteric liquid crystals that use circular polarization for wavelength selection).

In operation, the thermal imager 100 converts mid- to long-wavelength IR light 11 (e.g., light at wavelengths of 2-14 μm, 3-5 μm, 5-8 μm, or 8-14 μm) from a scene 10 into an electronic image 20. The IR lens 102 images IR light 11 that is emitted and/or scattered by objects in the scene 10 through a dichroic beam splitter 104 and onto one or more pixels 112 in the liquid crystal transducer 110. The liquid crystal material (not shown) in the pixels 112 absorbs the IR light 11; this causes the liquid crystal material to increase in temperature, which in turn causes the liquid crystal material's physical properties (index of refraction, LC molecule pitch) to change. The changes in the liquid crystal material's physical properties manifest themselves as a change in the liquid crystal material's birefringence as described in greater detail below. In some cases, the change in birefringence with temperature can be about 0.005/° C. to about 0.2/° C. Similarly, reducing the intensity of the incident IR light 11 causes the liquid crystal material to cool; this induces a corresponding change in the liquid crystal material's birefringence.

The thermal imager 100 senses the change in liquid crystal birefringence by measuring the intensity of polarized visible light 12 transmitted through the liquid crystal transducer 110 Sénarmont compensator 130. Put differently, the thermal imager 100 converts IR light 11 into visible light that can be measured with a conventional solid-state imager 140 with relatively high dynamic range (e.g., 60 dB), fine spatial resolution (e.g., micron-scale pitch), and/or a large format (e.g., several megapixels). In this case, the light source 120 emits a beam 12 of collimated, linearly polarized visible light towards the liquid crystal transducer 110. The beam 12 may be bandlimited (e.g., with a 10 nm passband filter) to avoid reducing gain due to polarization dispersion. As the beam 12 propagates through the liquid crystal transducer 110, its polarization state changes due to the birefringence of the liquid crystal material in the pixels 112.

As explained in greater detail below with respect to FIGS. 2A-2E, the pixels 112 are suspended from a transparent substrate 114 by thermal legs 116. The thermal legs 116 thermally isolated the pixels 112 from each other and from the transparent substrate 114 to prevent crosstalk. Thus, the temperature (and birefringence) of each pixel 112 depends substantially on the intensity of the incident IR light 11.

Because each pixel 112 may experience a different temperature change and hence have a different birefringence, the polarization state of the beam 13 transmitted through the liquid crystal transducer 110 may vary across the liquid crystal transducer 110. For example, pixels 112 with large birefringence changes may transform the polarization state from a linear state to a circular state or an elliptical state with a high degree of ellipticity. Similarly, pixels 112 with small birefringence changes may transform the beam's polarization from a linear state to an elliptical state with a low degree of ellipticity (e.g., a nearly linear state).

The polarization state of the transmitted beam 13 may also vary in time due to temporal fluctuations in the temperature(s) of the scene. The birefringence depends on the liquid crystal order parameter, S, which is a molecular parameter, any change in the temperature of the liquid crystal induces a change in birefringence with a response time on the order of that for molecular fluctuations (e.g., <1 microsecond). Generally, at least a portion of the transmitted beam 13 has an elliptical polarization state due to thermally induced changes in the birefringence of the liquid crystal transducer 110.

The dichroic mirror 104 reflects the visible, elliptically polarized beam 13 towards a visible lens 106 with a moderate to high f/# (e.g., an f/#≥1.). The visible lens 106 images the liquid crystal transducer 110 through the Sénarmont compensator 130, which includes a quarter-wave plate 132 and a polarizer 134, onto the solid-state detector 140 as shown in FIG. 1. The Sénarmont compensator 130 provides sensitive detections of changes in temperature and thus changes in infrared light 11 in the scene 10. In particular, the quarter-wave plate 132 transforms the visible, elliptically polarized beam 13 into a visible, linearly polarized beam 14 as described in greater detail below. This transformation significantly reduces noise due to random, undesired twist, bend, and splay of the liquid crystal material in the pixels 112. The polarization angle of the linearly polarized beam 14 matches the polarization angle of the elliptically polarized beam 13.

Transmitting the visible, linearly polarized beam 14 through the polarizer (analyzer) 134 reduces the amplitude of the visible, linearly polarized beam 14 by amount proportional to the inner product of the polarization angle of the linearly polarized beam 14 with the polarization angle of the polarizer 134. For example, the polarizer 14 may be oriented orthogonally to the polarization angle of the beam 12 emitted by the light source such that pixels 112 with half-wave retardance at visible wavelengths yield 100% transmission. The resulting polarized beam 15 illuminates the solid-state detector 140 with an amplitude proportional to the polarization angle of the linearly polarized beam 14, which in turn is proportional to the birefringence of the pixels 112 in the liquid crystal transducer 110. The amplitude of the polarized beam 15 may vary in space and/or time with variations in the pixels' birefringence, which varies with the intensity of the IR light 11 from the scene 10. The solid-state imager 140 detects the intensity of the polarized beam 15 and generates an image 20 of the scene suitable for digital manipulation, storage, and/or transmission.

Those of skill in the art will readily appreciate that the thermal imager 100 shown in FIG. 1A can include additional optical elements (e.g., lenses, mirrors, beam splitters, filters, etc.) and/or can be reconfigured to operate in different geometries. For instance, the liquid crystal transducer 110 may be coated or backed with a mirror or reflective surface to reflect the incident visible light 12 back through the liquid crystal transducer 110 in a double-pass reflection geometry. Similarly, the dichroic mirror 104 may transmit visible light and reflect IR light. And the lenses 102 and 106 may include any number of individual lens elements (i.e., they may be compound lenses) and/or may be used with additional beam-shaping elements depending on the application.

Sénarmont Compensator for Twist, Bend, and Splay Noise

As described above, the thermal imager 100 shown in FIG. 1A includes a Sénarmont compensator 130 to reduce or eliminate noise caused by undesired liquid crystal deformation, including the twist, bend, and splay deformation described above. The Sénarmont compensator 130 includes a quarter-wave plate 132 and a polarizer 134 that are aligned with respect to the liquid crystal cells (pixels) 112 and the polarization angle of the visible beam 12 incident on the pixels 112 to produce an output 15 with a linear polarization state regardless of the input polarization state. This increases the signal-to-noise ratio when detecting the temperature-induced change in birefringence.

Figure 1B:
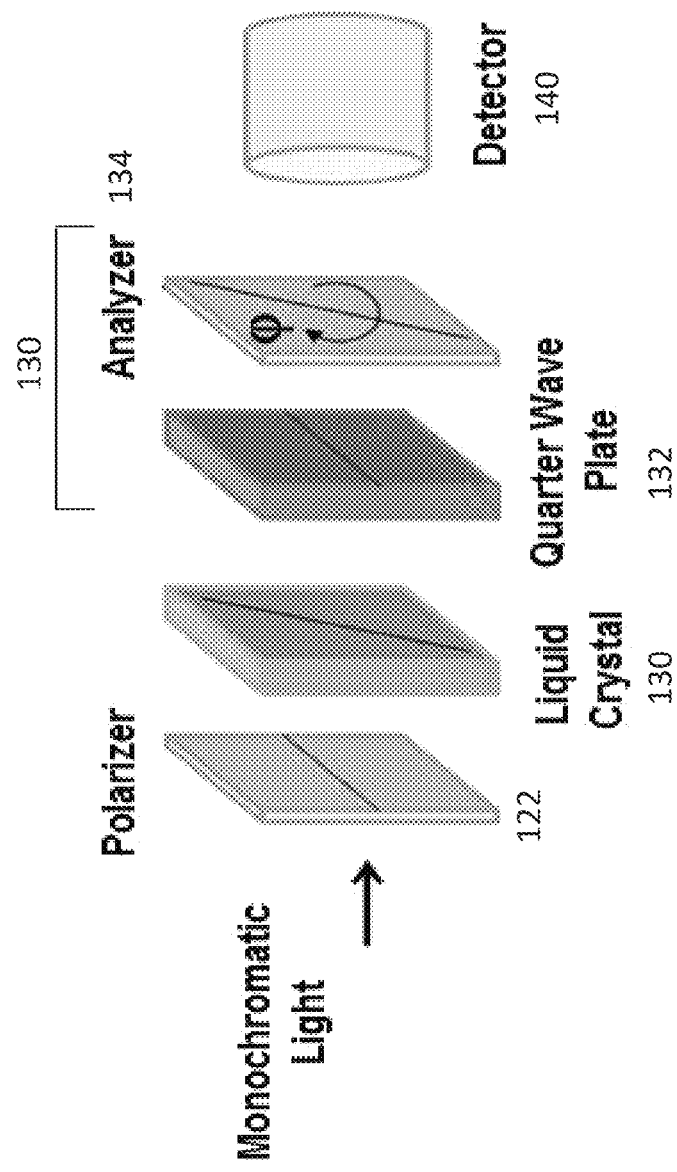
FIG. 1B shows alignment of the Sénarmont compensator and polarizing optics of FIG. 1A in greater detail.

FIG. 1B illustrates the orientations of the quarter-wave plate 132, polarizer 134, and liquid crystal transducer 110 with respect to the polarization angle of the visible beam 12 incident on the liquid crystal transducer 110. The incident beam 12 is polarized at 45° (e.g., by propagation through a horizontal polarizer 122) with respect to the liquid crystal optical axis, which is indicated in FIG. 1B by a diagonal line across the liquid crystal transducer 110. In other words, the extraordinary index of refraction ($n_e$) of the liquid crystal transducer 110 is at 45° with respect to the incoming polarized light 12. And as understood by those of ordinary skill in the art, the ordinary ($n_o$) index of refraction of the liquid crystal transducer 110 is perpendicular to the extraordinary index and at −45° with respect to the incoming polarized light 12.

The quarter-wave plate 132 has its optical axis aligned with the incoming polarized light. The angle $\phi$ of the analyzer 134 can be changed from 0° to 360° to find the maximum signal-to-noise ratio. In actual operation, the angle $\phi$ can be fixed based on the desired SNR and the measured, simulated, or calculated birefringence of the liquid crystal transducer. In other operating modes, the analyzer may be rotated to find a minimum or maximum point for several measurements.

Without being bound by any particular theory, the intensity of the beam 15 transmitted by the Sénarmont compensator 130 can be written as:

$$I = I_0 \cos^2\left(\varphi + \frac{\Gamma}{2}\right) \quad \text{(EQN. 1)}$$

where I is the signal intensity at the detector, $I_0$ is the input intensity, $\phi$ is the analyzer angle, and $\Gamma$ is the retardation of the liquid crystal transducer at its nominal (constant) operating temperature. The retardation is given by EQN. 2:

$$\Gamma = \frac{2\pi \Delta n(T) d}{\lambda} \quad \text{(EQN. 2)}$$

where $\Delta n(T)$ is the temperature dependent birefringence, d is the thickness of the LC layer, and $\lambda$ is the visible wavelength of the input light (the quarter wave plate is optimized for $\lambda$).

The Sénarmont optical arrangement allows for the value of the analyzer angle $\phi$ to be adjusted to give the maximum change in intensity with temperature for a given value of $\Gamma$ (that is dependent on the cavity thickness). Modeling and measurements show that the maximum SNR is close to the maximum slope of the Sénarmont signal. The maximum signal difference in intensity through the analyzer occurs if the output light signal is linearly polarized.

Without being bound by any particular theory, the signal S, noise N, and signal-to-noise ratio SNR for the signal detected by the system 100 shown in FIG. 1A can be written as, respectively:

$$S = I_0[\sin^2(\Gamma/2 - \varphi) - \sin^2(\Gamma/2 + \varphi)]$$

$$N = \sqrt{I_0[\sin^2(\Gamma/2 - \varphi) + \sin^2(\Gamma/2 + \varphi)]}$$

$$SNR = \sqrt{2I_0}\left[\frac{\sin(\Gamma)\sin(2\varphi)}{\sqrt{1-\cos(\Gamma)\cos(\varphi)}}\right]$$

In this case, the signal is defined as the difference in the signal between two adjacent analyzer angles. The noise is defined as the standard deviation of the detected light signal at either of the angle settings (the two nearest neighbor angle points have about the same standard deviation).

Taking the derivative of the SNR with respect to the analyzer angle φ yields:

$$\cos(\Gamma) = \frac{2\cos(2\varphi)}{1+\cos^2(2\varphi)}$$

Solving this equation for the analyzer angle φ in terms of the baseline liquid crystal birefringence Γ yields the analyzer angle φ that should yield the maximum and minimum SNRs for a given baseline liquid crystal birefringence Γ. Generally, as the baseline liquid crystal birefringence Γ decreases, the optimum goes towards null.

Figure 17A:
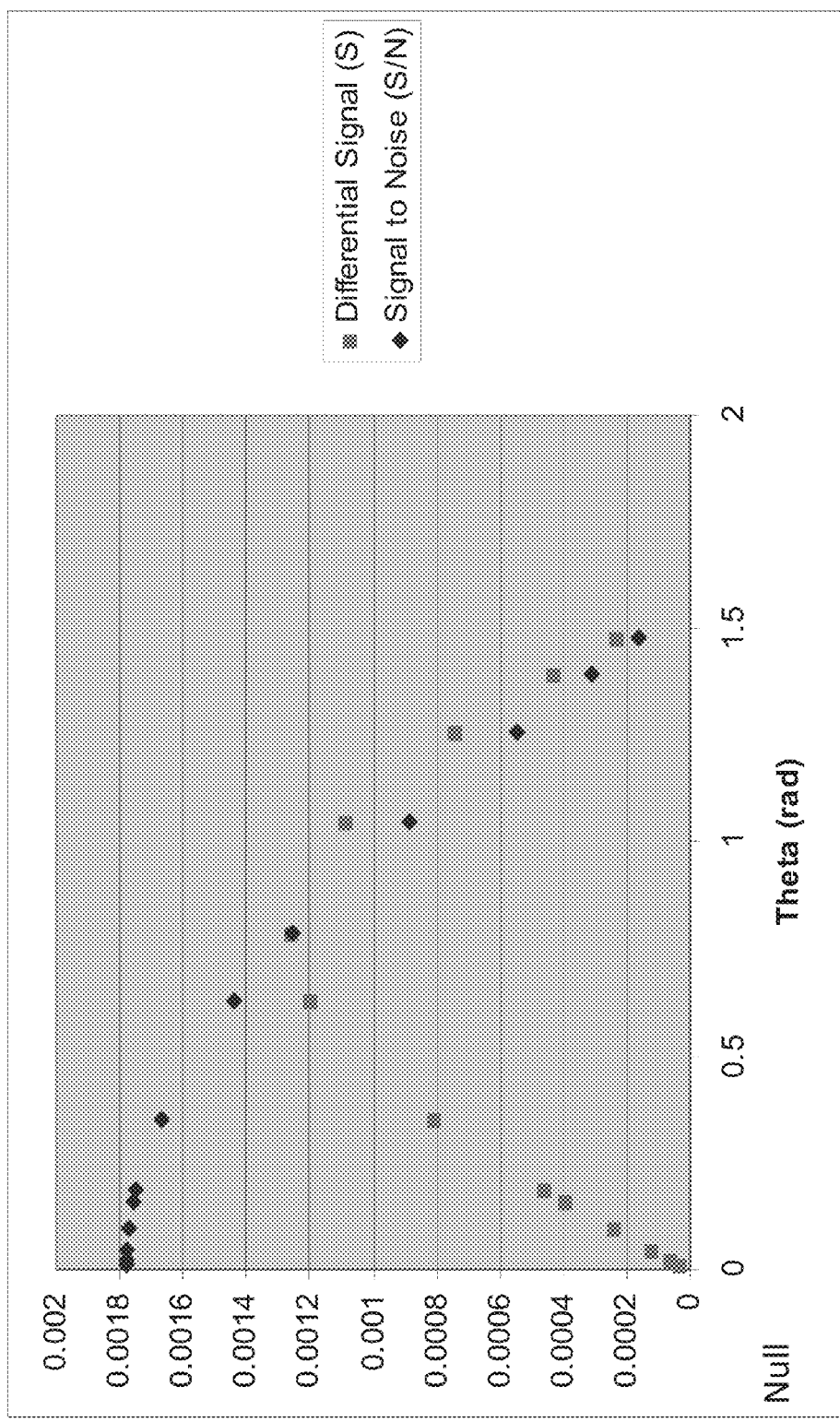
FIGS. 17A-17C are plots of simulated and measured differential Senarmont signals and signal-to-noise ratios with different noise sources.
Figure 17B:
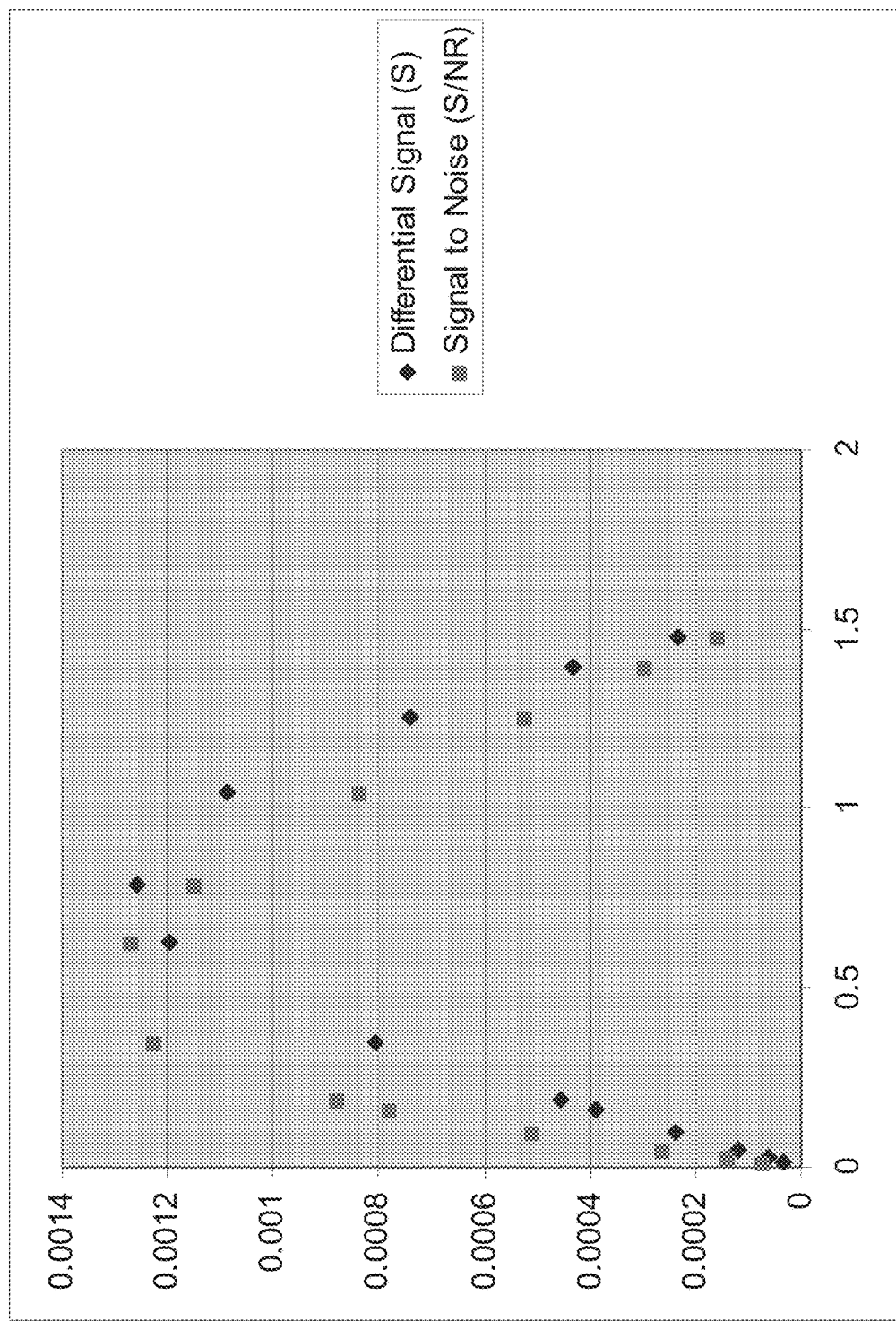
Figure 17C:
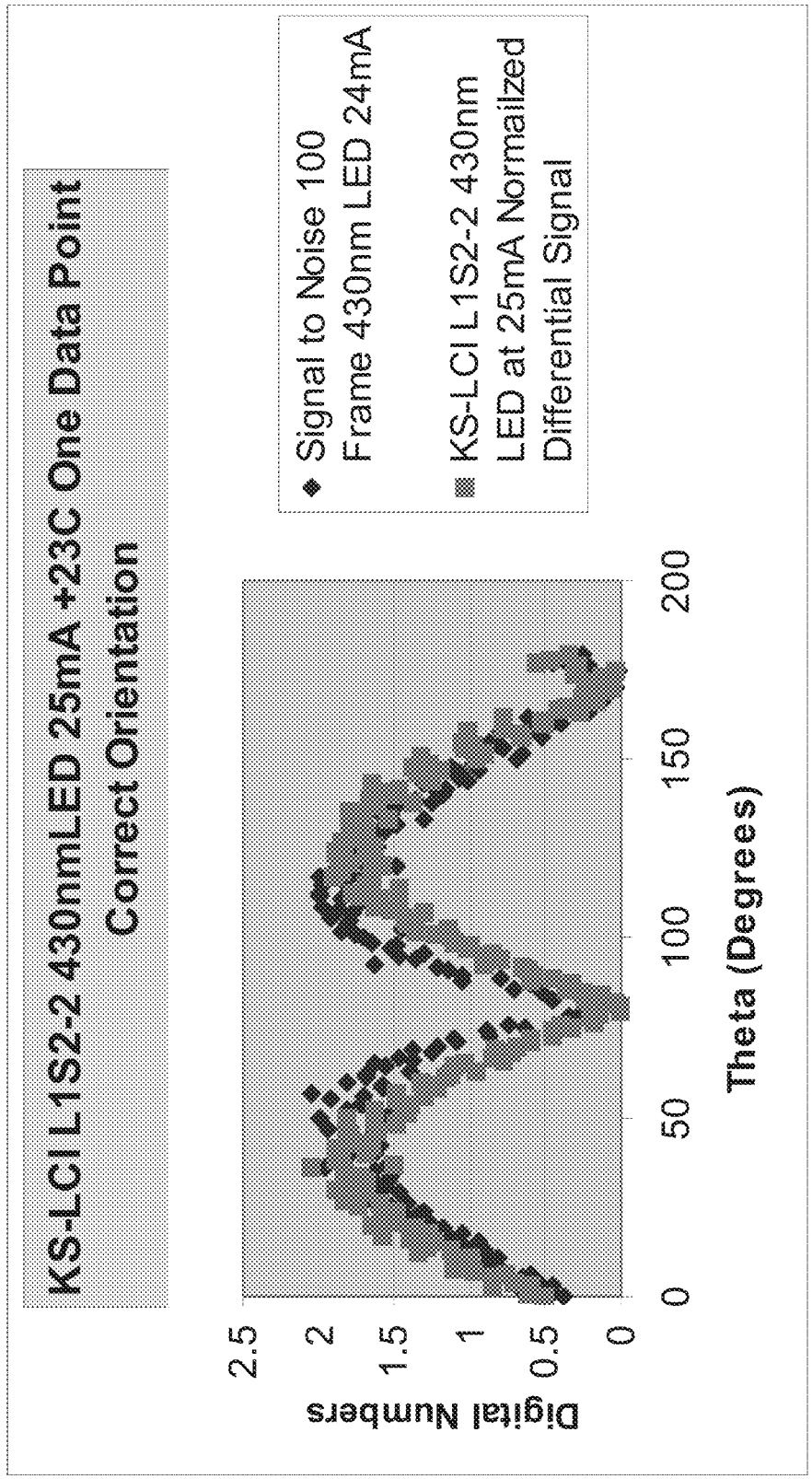

The analysis above includes shot noise and indicates that the maximum SNR is near the null. Without being bound by any particular theory, this makes sense since as the signal goes to zero so does the noise. However, if the detector readout noise, dark current noise, and liquid crystal noise are added, the maximum SNR may shifts to near midway between the null and maximum of the Sénarmont signal, e.g, as shown in FIGS. 17A-17C. These plots show the simulated Sénarmont signal with shot noise only (FIG. 17A), the simulated Sénarmont signal with other noise sources (FIG. 17B), and a measured Sénarmont signal (FIG. 17C). This may be occur because this is where the maximum slope occurs in the Sénarmont signal. The calculated and measured noise qualitatively are similar.

FIGS. 2A-2C are plots of experimentally measured signals transmitted through a Sénarmont compensator as a function of analyzer angle with respect to the polarization angle of the input beam 12. FIG. 2A shows the transmitted signal power versus analyzer angle; it shows that the maximum transmission occurs at 120°, 300°, and so on. FIG. 2B shows the standard deviation in the transmitted signal power versus analyzer; again, the maxima are at 120°, 300°, and so on. And FIG. 16C shows that the SNR peaks at analyzer angles of 0°, 60°, 180°, 240°, and so on. The SNR is defined as $\Delta I/(\sqrt{2}\, \sigma_I)$, where $\Delta I$ is the change in signal for a degree change in the analyzer angle and $\sigma_I$ is the signal intensity standard deviation. The $\sqrt{2}$ term in the equation takes into account the subtraction of two signals.

To generate FIGS. 2A-2C, the light 13 exiting the liquid crystal cell 110 was selected to have a polarization state that is almost circular without the quarter-wave plate 132. This is expected based on the optical wavelength and liquid crystal cell thickness used in the measurements. Thus, the change in signal measured after the analyzer is very low compared to the condition with the quarter-wave plate 132.

The noise (standard deviation) for most of the measurements is limited by the Poisson distribution of the input light signal. Fluctuations from the LCs are observed at high-input-light signal levels beyond where the thermal imager is expected to operate and thus do not affect the SNR. The fluctuations observed at these high-light levels are caused by the twist, bend, and splay motions of the LCs.

The noise is about higher without the quarter-wave plate 132 compared to the measurement with the quarter-wave plate 132. This result was unexpected and, to the inventors' knowledge, is not mentioned anywhere in the literature. The quarter-wave plate 132 is filtering out some of the polarization noise, improving the signal-to-noise ratio. The maximum signal-to-noise is almost 5 times higher with the quarter-wave plate for the measurement conditions used.

Figure 3A:
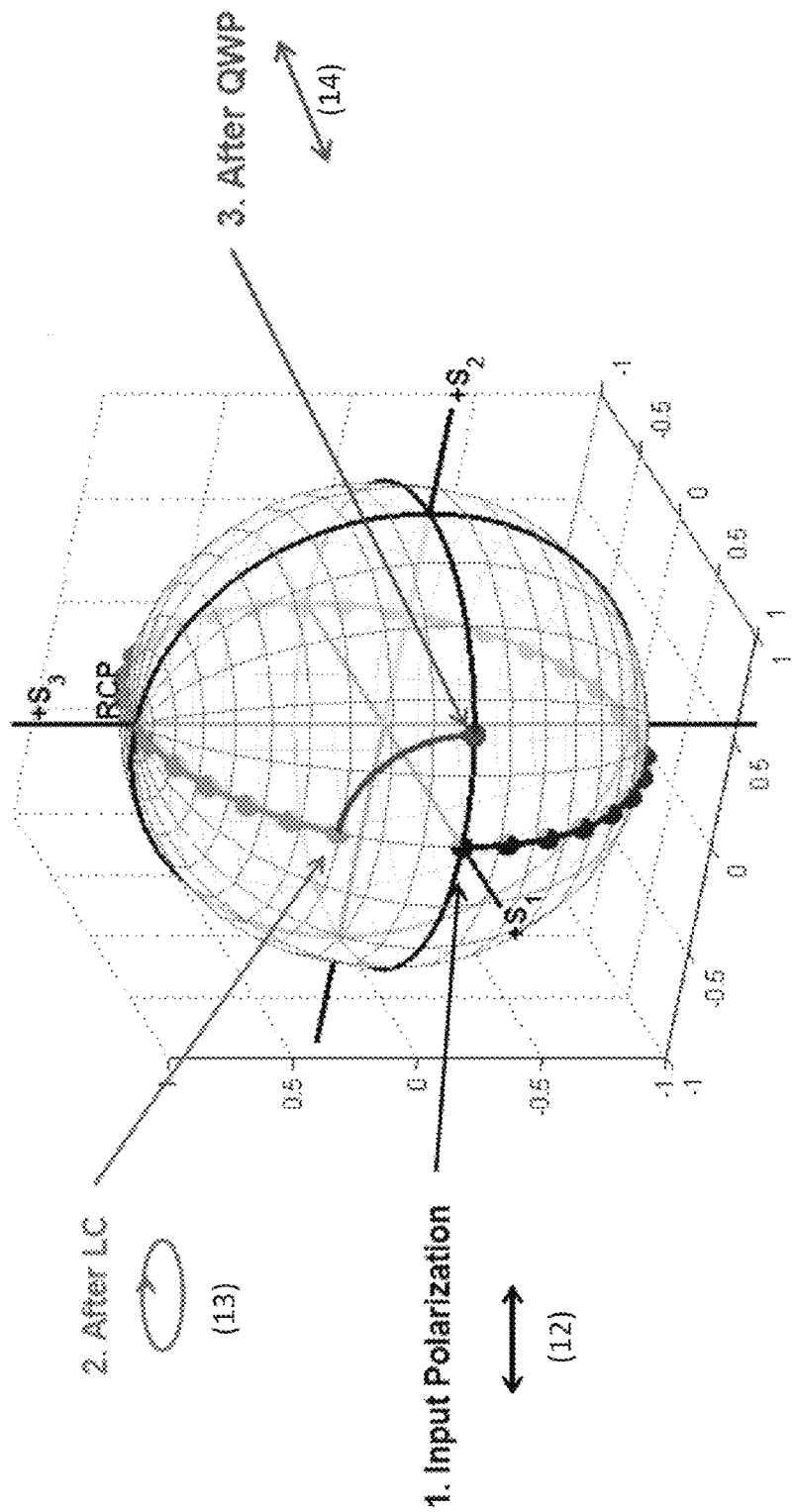
FIG. 3A is a Poincaré sphere diagram that shows how a Sénarmont system transforms an arbitrary elliptical polarization state produced by propagation through a (heated) LC-filled microcavity into a linear polarization state.

FIG. 3A shows the evolution of the polarization state, plotted on the Poincaré sphere, of the visible light propagating through the thermal imager 100. As understood by those of ordinary skill in the art, the axes of the Poincaré sphere represent the Stokes vectors, which can be expressed in terms of the measured intensity I, the polarization angle φ (longitude), and the degree of ellipticity χ (latitude):

$S_0$=I
$S_1$=Ip cos 2ψ cos 2χ
$S_2$=Ip sin 2ψ cos 2χ
$S_3$=Ip sin 2χ

These vectors are typically normalized to the intensity before being plotted on the Poincaré sphere.

As shown in FIG. 3A, the input beam 12 is horizontally polarized. As the beam propagates through the liquid crystal transducer 110, its polarization state evolves along the great circle connecting the north and south poles of the Poincaré sphere. How far (or how many times) the beam's polarization state evolves along this great circle depends on the birefringence of the liquid crystal transducer 110. In many cases, though, the beam 13 emitted by the liquid crystal transducer 110 is elliptically polarized as shown in FIG. 1B. The quarter-wave plate 132 transforms the elliptically polarized beam 13 to a linearly polarized state whose polarization angle depends on the degree of ellipticity of the elliptically polarized beam 13. (Put differently, the quarter-wave plate 132 is oriented to swap latitude for longitude.) The analyzer 134 then projects the resulting linearly polarized beam 14 into a predetermined polarization angle (e.g., the horizontal polarization angle of the input beam 12).

Without the quarter-wave plate 132, no signal difference may be detected if beam 13 is circularly polarized. The quarter-wave plate 132 provides a linearly polarized output 14 no matter what the visible wavelength or liquid crystal thickness. Having the quarter-wave plate 132 in the system increases the options for choosing the visible wavelength and liquid crystal thickness.

FIGS. 3B-3E show various aspects of Senarmont compensation. FIG. 3B gives the simulated twist noise on the Poincare sphere with and without the quarter-wave plate 132. FIG. 3C is the normalized signal and FIG. 3D is the standard deviation. For these simulation conditions, the standard deviation can be up to three times lower with the quarter-wave plate 132 than without it. FIG. 3E shows simulations of in-plane and out-of-plane liquid crystal fluctuations. Measured results show a large decrease in noise with the quarter-wave plate 132, which would tends to be more effective with in-plane fluctuations. The in-plane fluctuations are consistent with twist fluctuations being the major liquid crystal noise source.

Liquid Crystal Transducers for Liquid Crystal Thermal Imagers

FIGS. 4A-4E illustrate the liquid crystal transducer 110 in greater detail. FIG. 4A, which is a cross-sectional view, shows that a typical pixel 112 defines a cavity 113 filled with liquid crystal material 115. (The cavity can also contain gas, transparent liquids, and/or solids, depending on the application.) Generally, thinner liquid crystal layers 113 exhibit lower noise than thicker layers. And the liquid crystal material 115 may be selected to have a phase change, where the temperature dependence of the birefringence tends to be high, that occurs near the desired operating temperature range.

The pixel 112 also includes alignment layers/surfaces 119 that align the liquid crystal material 115 to the pixel walls 118. A plug 117 fills a hole 111 in the pixel 112 and prevents the liquid crystal material 115 from leaking out of the cavity 113. And thermal legs 114 support the pixel 112 above the substrate 116 (e.g., a glass substrate) that is transparent at visible and/or IR wavelengths.

In some cases, the cavity 113, which may be about 2 microns to about 25 microns or even 100 microns wide, has a thickness of, for example, 0.5 microns to about 10 microns. The cavity thickness may be chosen such that the cavity 113 is resonant at a (coherent) visible wavelength used to interrogate the liquid crystal birefringence. A resonant cavity can be used to increase the signal and noise linearly as opposed to the super-linear increase in noise for an equivalent thicker liquid crystal cell. For example, if the resonant cavity is resonant at some wavelength for the ordinary and extraordinary refractive indices of the liquid crystal, then the optical signal may travel several times back and forth through the cavity. If the optical signal travels back and forth through the cavity N times, the effective phase change is greater by N, which in turn increases the signal change N.

A resonant cavity may also "detune" with changes in temperature to enhance the temperature-dependent transmission. For example, as temperature changes cause the cavity's optical thickness to change, the transmittance of the cavity will change as the cavity moves in and out of resonance with the incident visible beam.

The cavity 113 is thermally floating and yet can absorb thermal radiation as described above with respect to FIG. 1A. A change of temperature of the cavity 113 changes the physical shape of the cavity 113 and/or changes the properties of liquid crystal material 115 contained in the cavity 113. The cavity 113 acts as a transducer that converts the absorbed thermal energy intensity into a visible light intensity as described above. When the cavity 113 is placed near an object that has a temperature above ambient temperature, the cavity temperature will climb. With a proper setup—for example, a visible light source, lenses, and polarizers as shown in FIG. 1A—the cavity temperature can be calibrated to the surface of the object. Similarly, with a proper lens, the thermal imager can be calibrated to a surface in the focal plane of the lens.

In order to reduce the cavity's sensitivity to fluctuations in the temperatures of the substrate 116 and of neighboring pixels 112, the cavity 113 is thermally isolated from its surroundings. And in order to thermally insulate the cavity 113, the cavity's surroundings may be a vacuum with one or more thermally insulating legs 114 as the (possibly only) physical attachment between the cavity 113 and the substrate 116. The legs 114, which are also called pedestal structures, provide mechanical support for the cavity 113, thermal isolation from adjacent pixels, and thermal resistance to the transparent substrate 116. The cavity 113 and legs 114 may be cooperatively designed for sensitivity and fast (e.g., millisecond) response times.

The fill hole 111 can be quite small since it is often possible to rely on capillary action to fill the cavity 113 with liquid crystal material 115, such as 5CB and E7 liquid crystals. These liquid crystals were chosen because the phase transition from nematic to isotropic is in at a reasonable temperature (35° C. for 5CB and 55° C. for E7) and exhibit a maximum birefringence change of about $\Delta n = 0.2$. Other liquid crystals are also possible, including those that exhibit $\Delta n > 0.6$.

The hole 111 should be larger than a molecule of the liquid crystal 115, but small enough so that it can be sealed. One advantage of a small hole is that small holes are easier to seal. As shown in FIG. 4A, the hole 11 is sealed with a plug 117 made of reactive mesogen, for example. It is even possible that the top plate of the cavity 113 could be porous and sealed with a coating material after filling. Since part of the manufacturing process (described below) usually involves emptying the cavity 113 first before filling it with liquid crystal material 115, if the hole 113 is small, more than one hole may be used to facilitate or speed the filling process.

As shown in FIG. 4A, each pixel 112 includes respective alignment layers or surfaces 119 for aligning the liquid crystal material 115 with respect to the cavity 113. The alignment layers or surfaces 119 seed the orientation of the liquid crystal molecules. The alignment layer 119 has an anchoring energy which determines how much energy is required to change the orientation of the director of each liquid crystal molecule that contacts the layer 119. Without being bound to any particular theory, alignment fluctuation noise in the liquid crystal material 115 is related to the anchoring energy; the higher the energy, the lower the thermal director fluctuation (i.e., the lower the noise).

Suitable alignment techniques include, but are not limited to rubbed polyimide, ionic milling, lapped inorganics, glancing angle deposition, and photo-alignment. Most liquid crystal displays use polyimide alignment layers that are coated and mechanically rubbed to elongate the polymer chains and to create an anisotropic interaction that aligns the liquid crystal director with a large anchoring energy. In practice, the polyimide is deposited on two relatively large flat glass pieces and then the pieces are brought together within a few microns, the gap being set by glass ball spacers.

Unfortunately, some of the polyimide properties may not be compatible micron-scale cavities like those shown in FIGS. 4A-4E. In thermal imagers and other applications where isolated cavities with lateral dimensions of microns are desired, alignment may be provided by mechanical diamond lapping of surfaces (e.g. silicon dioxide, molybdenum). The lapping creates parallel "troughs" in the inner surfaces of the cavity. These troughs have dimensions of several nanometers in height and width and are used to align the liquid crystal material 115 to the cavity 113 as described in greater detail below.

FIG. 4C shows photographs of a fabricated liquid crystal transducer with several pixels. FIGS. 4D and 4E show scanning electron microscope (SEM) images of the same device. Each pixel in the device includes a liquid crystal cavity that is about 20 μm×20 μm×1-2 μm and held about 1 to 2 μm above a transparent substrate approximately by four silicon nitride legs, each of which is approximately 2 μm wide×300 nm thick. The thermally resistive legs 114, which could also be made from a polymer, have a thermal resistance of $2\times10^{-8}$ W/K. More or fewer legs and different cavity shapes and fill factors are also possible. The top surface of the cavity may also be coated with the approximately 300 nm thick silicon nitride layer that forms the cavity.

Microcavity Fabrication Process

FIGS. 5A-5E illustrate a process 500 for fabricating a thermal pixel imager on an unpatterned substrate 516 (e.g., a fused silica or silicon substrate). For example, processing may begin on bare 200-mm fused silica wafers, e.g., for use in a transmission-mode thermal imager. An aluminum blocking layer 501 is deposited on the substrate 516 and windows are opened. The light may be blocked everywhere except where it will pass through the liquid crystal. A silicon dioxide layer 502 is deposited and a planarizing polish is done as shown in FIG. 5A. An approximately 1- to 2-μm-thick molybdenum sacrificial layer 503 is deposited on top of the oxide and dry etched. Next, an approximately 300-nm-thick inorganic layer 514 (e.g., silicon nitride or silicon dioxide) is deposited and dry etched to form the thermal legs and the bottom of the cavity as shown in FIG. 5B.

Next, a silicon dioxide layer (not shown), 100 nm thick, is deposited and diamond lapped to generate an alignment surface 119. A second 1-μm-thick molybdenum sacrificial layer 505 is deposited and etched to define the cavity interior. The second sacrificial layer 505 is diamond-lapped to create a negative alignment surface 519. A second 300-nm-thick inorganic layer 518 (e.g., silicon nitride or silicon dioxide) is deposited over the second sacrificial layer 505 and dry etched to form the top surface and sides 118 of the cavity as shown in FIG. 5C. During this etch, a 2-μm-diameter hole 111 for filling the cavity 113 with liquid crystal material 115 is also created in the inorganic layer on top of the cavity 113. After the hole 111 is formed, the top molybdenum sacrificial layer 505 is etched in hydrogen peroxide, leaving behind another alignment surface 119 on the upper interior surface of the cavity 113. This upper alignment surface 119 is the negative of the negative alignment surface 519 formed by diamond lapping the second sacrificial layer 505. The bottom molybdenum 503 is protected during this step by the 100-nm-thick silicon dioxide layer and photoresist.

Alternatively, the silicon nitride 514 can be lapped directly to form an alignment surface 119 without the need for second inorganic layer 518. In this example, the second inorganic layer 518 protects the bottom sacrificial layer 503 while the top sacrificial layer 505 is being etched. It also protects the bottom inorganic layer 514 while the top inorganic layer 518 is being etched.

Once the molybdenum is removed from the cavities, liquid crystal material 115 is poured over the cavity surface. The liquid crystal material 115 easily wets the silicon nitride surface and is spontaneously wicked through the 2-μm-diameter hole 111 into the cavity 113. Suitable liquid crystal material includes 4'-pentyl-4-biphenylcarbonitrile (5CB) although other mixtures are also possible.

The bulk liquid crystal material is then rinsed off the surface with deionized water. The amorphous fluoropolymer CYTOP (Asahi Glass Co.) is spun over the thermal imager device(s) on the wafer and annealed to create plugs 117 for the cavities 113 as shown in FIG. 3D. The CYTOP is then patterned and etched in an oxygen-plasma to open holes over the bottom molybdenum 503. Using CYTOP as a mask, the protective oxide layer (not shown) is etched with buffered hydrofluoric acid, exposing the bottom molybdenum 503. Once the silicon dioxide is removed from the holes 111, a second pattern and etch is done to the CYTOP, which forms the cavity plug 117. The bottom molybdenum 508 is then removed using hydrogen peroxide to yield the pixel 112 shown in FIG. 5E. The silicon dioxide layer over the bottom molybdenum 508 acts as a support keeping the cavities elevated during the wet hydrogen peroxide etch process. If desired, the silicon dioxide layer 502 may be removed through an ion milling process that releases the filled cavities.

The fabrication process 500 shown in FIGS. 5A-5E has fewer than 10 photolithographic steps to create the transducer. This compares well to the greater than 40 mask steps for making a conventional microbolometer. In addition, the manufacturing constraints, such as fill factor, can be relaxed to ease fabrication. Other variables can be adjusted as well, including the array size and the number of thermal legs per pixel. For instance, the transducers shown in FIGS. 4C-4E are made with a mask set having arrays as large as 256×256 pixels and four thermal legs per pixel. The same mask set has several smaller arrays with various other structures including thermal pixels with two thermal legs. Test structures can also fabricated with the transducer devices for characterization of the pixel structure's optical, mechanical, thermal, and temporal properties as well as process control monitors.

Some devices may also include an additional infrared (IR) absorber layer that is integrated into the process to tune the structure for the IR absorption. This absorber layer can be located on the cavity structure, e.g., on top of the completed cavity or at the bottom of the cavity before the silicon nitride is deposited. It could be TiN, nickel, black gold, black carbon, a plasmonic absorber, or any other suitable materials. The layer can be very thin, e.g., on the order of a few nanometers. Note that the silicon dioxide, silicon nitride, and liquid crystal each absorb some LWIR radiation.

The microcavities and fabrication process disclosed herein are also useful for other applications, including displays, even without the thermal isolation. Making an array of microcavities for a display is simpler than making an array for a thermal imager because the legs are not required. The pixels in the display can be subdivided into the micro cavities each having a size in the range of 10 to 50 microns and 2 to 25 microns thick. When filled with liquid crystal, the micro cavities become strong by retaining the lateral position of the liquid so that the thickness the liquid in the pixel is more uniform.

Flexible displays often use polyimide or some other polymer as the primary structural material instead of glass. Glass is tends to be too brittle and usually does not stretch much before it breaks. An advantage of plastic materials is that manufacturing of the display could use other techniques such as embossing the cavities and then bonding a cover sheet to create the cavities. By use of a subdivision of the pixels into walled off micro cavities (e.g., in a hexagonal close packed structure) the liquid crystal is trapped in a small chamber and is not free to move around during the flexing of the display. Once the cavities are filled with liquid crystal, this kind of structure may allow the electrodes and structural members to bend without undue stress and without allowing the thickness of the liquid crystal to vary in one area versus another.

This flexible display can be manufactured with most of the same steps used for glass substrates. The electrodes and the transistor can be formed on the polyimide substrate. The cavities can be made using the sacrificial layer described above with respect to FIGS. 5A-5E. It may be fortuitous to use some other sacrificial layer other than molybdenum, e.g., perhaps another polymer. The glass can be replaced with a polymer and the silicon nitride can be replaced with casting or spin coat of polyimide. After finishing the substrate with electrodes and transistor the sacrificial layer is added next. The top covering of the microcell can be made with tiny holes or it could be porous polyimide after first placing down an electrode layer with a hole or porous areas. The sacrificial layer could be removed through the hole or the porous layer and after filling with liquid crystal the porous layer could be coated with a reactive polymer that cures under ultraviolet or blue light. Another coating may seal the surface.

Creating Textured Alignment Surfaces for Aligning Liquid Crystals

Figure 6:
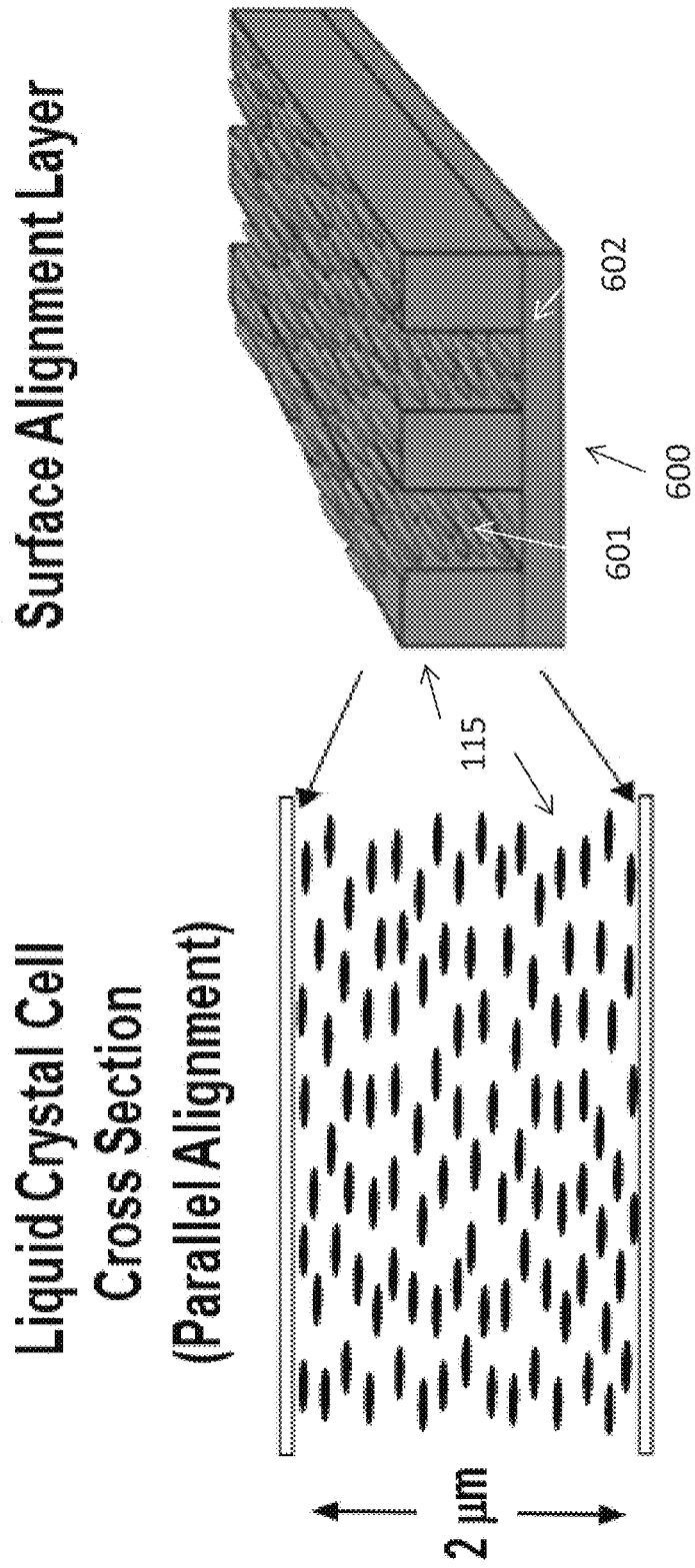
FIG. 6 is an illustration of a liquid crystal cell with planar alignment showing location of alignment surface.

FIG. 6 is a schematic illustration of a scratched or textured alignment surface 600 for aligning liquid crystal material to a substrate 602, such as an inner surface of a microcavity for a thermal imager, liquid crystal display, spatial light modulator, or other liquid crystal device. The alignment surface 600 includes several grooves 601, also called scratches or alignment features, which run parallel to each other. Liquid crystal molecules (represented as ellipses in FIG. 6) in the liquid crystal material 115 deposited on the substrate 602 align themselves such that their long axes are parallel to the grooves 601 in the alignment surface 600.

FIGS. 7A-7D illustrate lapping tools and a lapping process for creating the scratched or textured alignment surfaces like the one shown in FIG. 6. This lapping process is compatible with the fabrication process 500 illustrated in FIGS. 7A-7E. Lapping can be performed directly on the lower surface of a microcavity to create a first textured surface. It can also be performed on a sacrificial layer (e.g., the molybdenum layer 505 shown in FIG. 5C) to create a "negative" of a scratched alignment surface. Depositing another layer (e.g., silicon nitride layer 518 in FIG. 5C) on the textured surface of the sacrificial layer yields a scratched alignment surface that is exposed upon removal of the scratched layer.

Figure 7B:
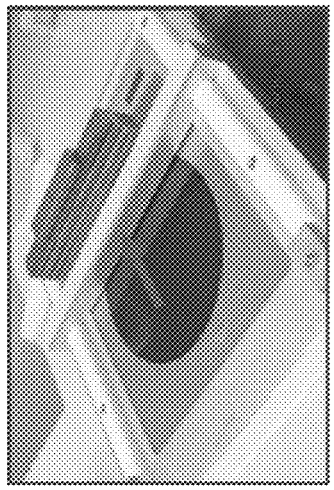
FIGS. 7A-7D illustrate a wafer-lapping technique for creating scratches or grooves for aligning LC material with respect to the interior surfaces of a microcavity.
Figure 7D:
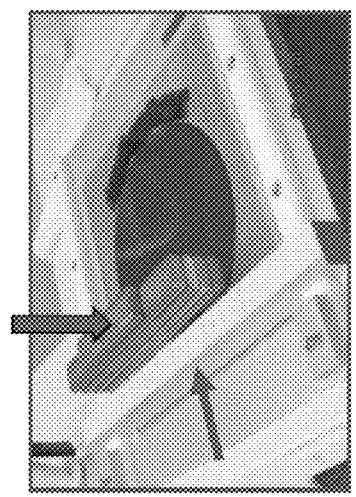
Figure 7A:
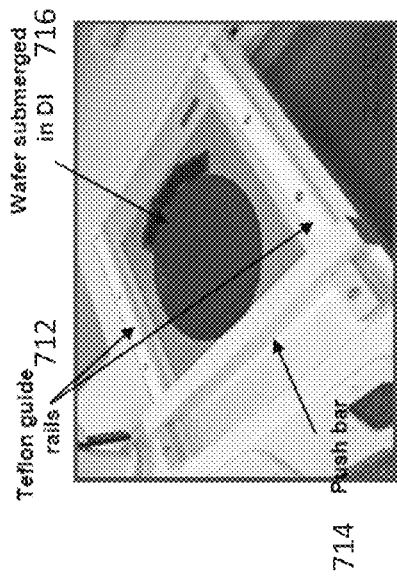

FIG. 7A shows a lapping tool 700 that can be used to texture or scratch the surface of a wafer or a layer deposited on a wafer. The lapping tool 700 includes a grit film 702 attached to a weight 704 and suspended from a stainless steel bar 706. In this case, the grit film 702 is a 500 nm diamond grit film with an area of 1 square inch and the weight is 4.15 lbs. to give a pressure of 4.15 psi. The grit film, area, and weight may be selected as desired, e.g., based on the surface material, to achieve a desired scratch depth and density, etc.

Figure 7C:
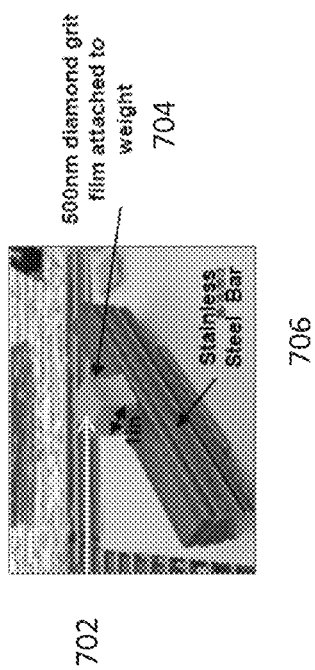

FIGS. 7B-7D illustrate how to lap a wafer 716 using the lapping tool 700 in order to create a textured surface. In FIG. 7B, the wafer 716 is submerged in de-ionized water in a lapping jig 710, which includes a push bar 714 that sits on a pair of Teflon guide rails 712 next to the wafer 716. The lapping tool 700 is placed in front of the push bar 714 and pushed back and forth across the wafer as shown in FIGS. 7C and 7D. The lapping tool 700 may be moved laterally and/or replaced between passes to texture different portions of the wafer surface. The wafer can also be oriented between layer depositions to achieve a desired alignment orientation. For instance, a first layer (e.g., a silicon nitride or oxide layer) on the wafer can be lapped in one direction, and a second layer (e.g., a sacrificial molybdenum layer) on the first layer can be lapped in the same direction or an orthogonal direction to create alignment surfaces that are parallel or orthogonal to each other, respectively.

FIGS. 8A and 8B illustrate lapping maps created by lapping different portions of an oxide layer and a molybdenum layer, respectively, at different pressures and with different numbers of passes. The bottom lapping pattern in FIG. 8A has been transferred through the molybdenum shown in FIG. 8B.

FIGS. 9A-9D show SEM images of a portion of the molybdenum layer under different lapping conditions. FIG. 9A shows that even without lapping, the lapping pattern from the bottom layer has been transferred through the molybedenum. FIG. 9B shows that four passes of 500 nm diamond grit film at 4.15 psi yields deep, relatively smooth grooves. At two passes with the same film and pressure, the grooves are not as deep or smooth as shown in FIG. 9C. And two passes of 500 nm diamond grit film at 1.9 psi yields shallower grooves.

Figures 10A, 10B:
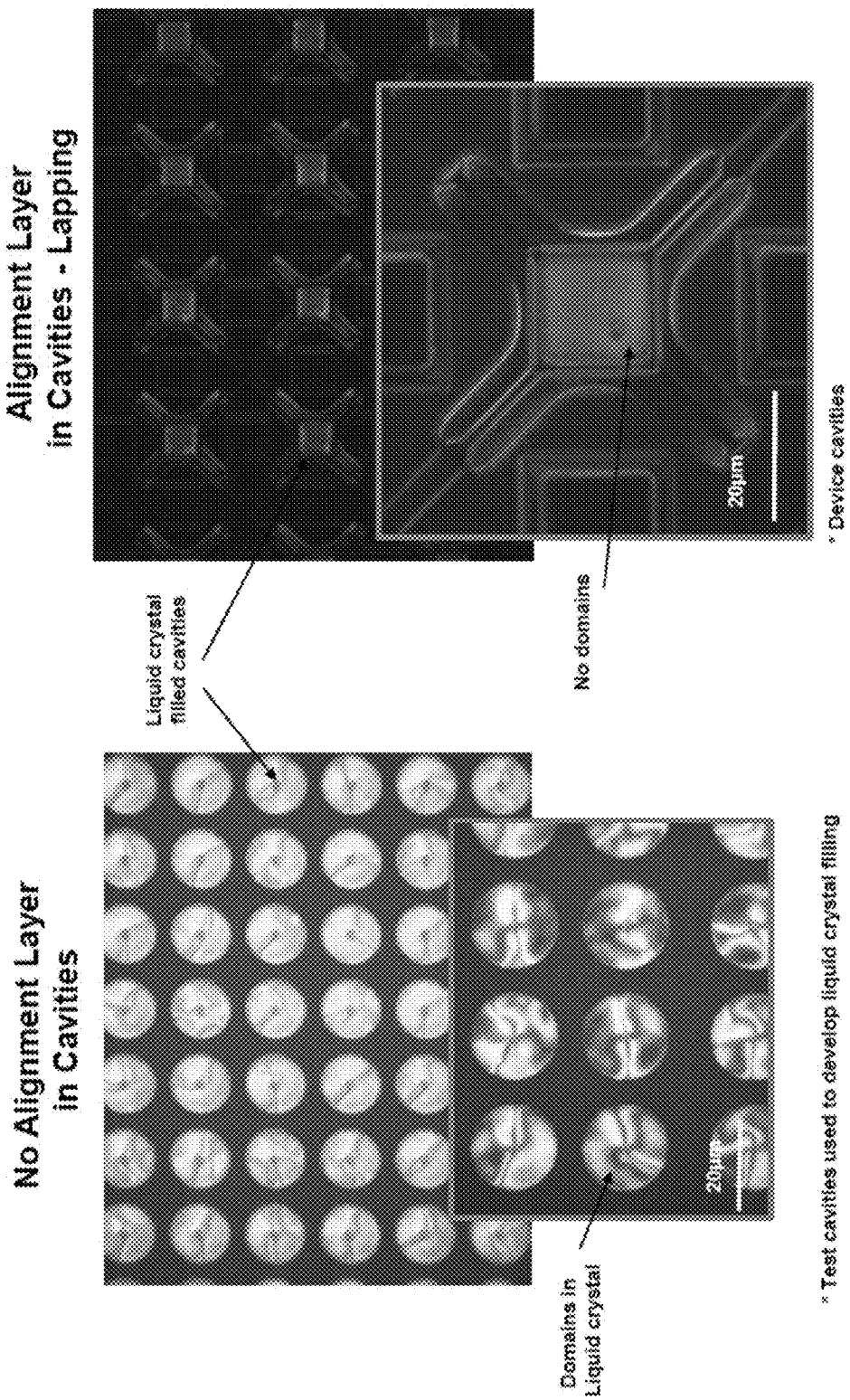
FIGS. 10A and 10B are photographs of liquid crystal-filled cavities without any alignment and with alignment, respectively.

FIGS. 10A and 10B show liquid crystal microcavities without and with lapping, respectively. FIG. 10A shows that without any alignment, the liquid crystal material behaves as a polycrystalline material with domains of dynamically varying shape and size. And FIG. 10B shows that with alignment surfaces created by lapping, the liquid crystal material aligns to form a single domain per microcavity.

Experimental Performance of an Uncooled Liquid Crystal Thermal Imager

The data shown in FIGS. 11-14 were obtained from measurements on liquid crystal cells, both larger-area sample cells and small device arrays. The bulk cells were relatively simple to fabricate and gave preliminary performance information. The measurements were done at 2 K to 3 K from the phase transition except where noted. The liquid crystal used in the measurements was 5CB because its phase transition is conveniently located at 308 K although other liquid crystal mixtures tested showed similar performance.

Figure 11:
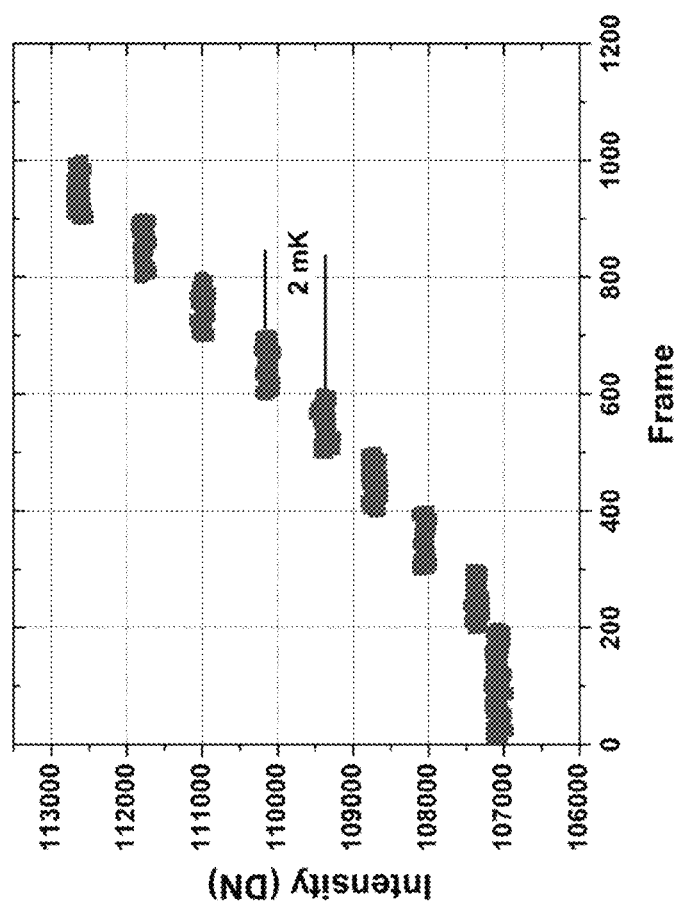
FIG. 11 is a graph showing signal change in digital numbers versus frame capture for 2-mK steps with the heater for a bulk liquid crystal cell.
Figure 12:
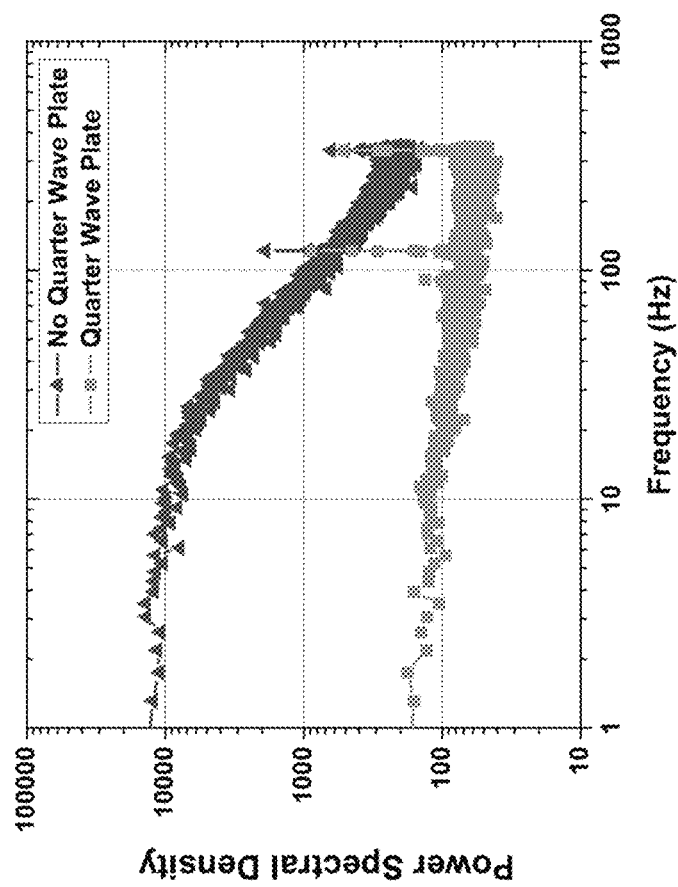
FIG. 12 is a graph of power spectral density curves near the phase transition shown in FIG. 15 with a quarter-wave plate (upper curve) and without a quarter-wave plate (lower curve).

FIGS. 11 and 12 are plots of experimental data obtained using 1-inch liquid crystal test cells. Each cell includes two glass slides with one side of each slide covered by an alignment layer (e.g., rubbed polyimide on indium tin oxide (ITO) or lapped silicon dioxide). The ITO is a standard in these cells for evaluating switching display processes, but the electrical switching is not used or needed in our measurements or operation of the thermal imager. A 2- to 3-μm-thick LC layer is injected between the glass slides with the LC facing the alignment layer on each slide. The thickness of the LC is part of the imager design and is chosen to give a response time of 10 ms based on reasonable thermal resistance values expected for silicon nitride legs used in the arrays.

FIG. 11 is a plot that shows the temperature sensitivity of the LC cells. The LC cells are placed on a substrate with a heater driven by a controller capable of 2-mK steps. The assembly is then placed in a dewar that is evacuated to below 1 mTorr. The visible-image detector may be a 640×480 CCD camera operating at 30 Hz or 60 Hz. A 24-μm area of the LC is imaged onto a 4×4 pixel area of the imager. The pixels are binned to increase the detected photoelectrons from the light passing through the liquid crystal area. The change in signal with temperature is measured by a change in intensity with the analyzer held constant.

The data in FIG. 11 give the change in intensity, in digital numbers, for 2 mK temperature steps. Approximately 100 frames are taken at each step with the camera operating at the 30 Hz or 60 Hz rate. The standard deviation calculated from a 2 mK step is about 225 μK. This can be related to a noise equivalent temperature difference (NETD) in the scene of about 18 mK by making the usual assumptions (e.g. 24-μm pixel, 30 Hz frame rate, f/1 lens, typical leg thermal resistance, etc.).

The background limited noise for this case is about 2 mK. The percent change in intensity with 1-K change can range from tens of percent to hundreds of percent depending on the temperature-difference from the phase transition temperature, as illustrated in FIG. 15. In operation, the thermal imager operated near the tens of percent change per 1 K. The temperature sensitivity for the data in FIG. 11 is limited by the test system and not the liquid crystal cell. For example, the noise is that from the Poison distribution of the input light.

Other performance characteristics measured on the bulk liquid crystal cells included dynamic range and response time. The bulk LC cell is measured to have a dynamic range greater than 10 bits by stepping in 2-mK increments over 0.5 K. The temperature resolution as shown in FIG. 11 is discernible across this range and relatively linear. For 225-µK steps, the maximum temperature would be 225 mK for a 10-bit dynamic range, which is well within the 3-K distance from the phase transition. To get a dynamic range of 10 bits, the optical imager should have greater than $10^6$ photoelectrons per pixel. The visible CMOS or CCD imager should accommodate the high signal levels. Recently, imagers have been designed that have large dynamic ranges, for example, by having high charge capacity or by doing an in-pixel A/D conversion. This strikes a balance among sensitivity, dynamic range, and noise. Operating too close to the phase transition may cause more molecular fluctuation noise to appear in the signal.

To measure the thermal response of the LCs in bulk cells, the glass slide surface facing the LCs coated with ITO is electrically pulsed at a high frequency through the connection on one side of the cell. This heats the LC enabling the rise time of the LCs to be measured by imaging the intensity change. The rise time is measured to be less than 30 ms, which is limited by the speed of the camera system.

FIG. 12 shows the power spectral density (PSD) measured using the Sénarmont system with and without the quarter-wave plate. A high-speed CCD camera operating at 700 Hz is used to collect the data. The noise of the cell is dominated by the shot noise of the visible light source (Poisson distribution) for the Sénarmont system with the quarter-wave plate in place. Also the 1/f noise is negligible for both conditions, but instead a Lorentzian-shaped curve is seen with a flat response at low frequencies corresponding to LC molecule twist fluctuations. The curve starts to decrease at about 20 Hz where the roll off frequency is related to the viscosity, elastic constant, and thickness of the cell. The curve becomes constant again at high frequencies where it is dominated by the shot noise of the visible light. The quarter wave plate may be important for removing most of the twist noise. Other particular arrangements can be found that reduce the twist fluctuations without the quarter wave plate, which depend on the phase retardation through the cell, the cell thickness, and alignment anchoring energy. However, the quarter wave plate removes the need for these special conditions.

Figure 13:
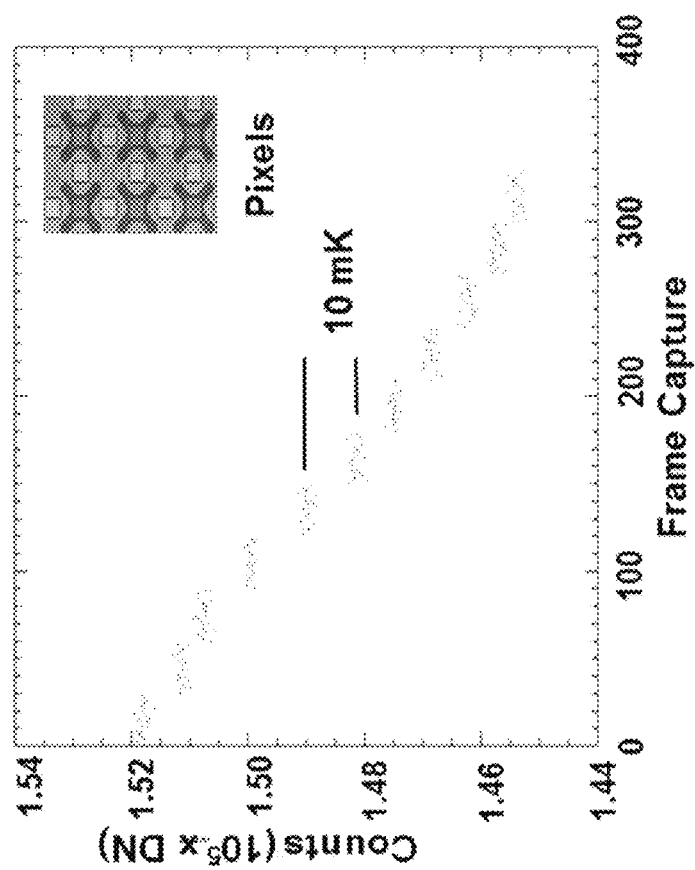
FIG. 13 is a graph of signal versus frame capture using 10-mK steps for a pixelated array. The inset shows a picture of a 2×6 array.
Figure 14:
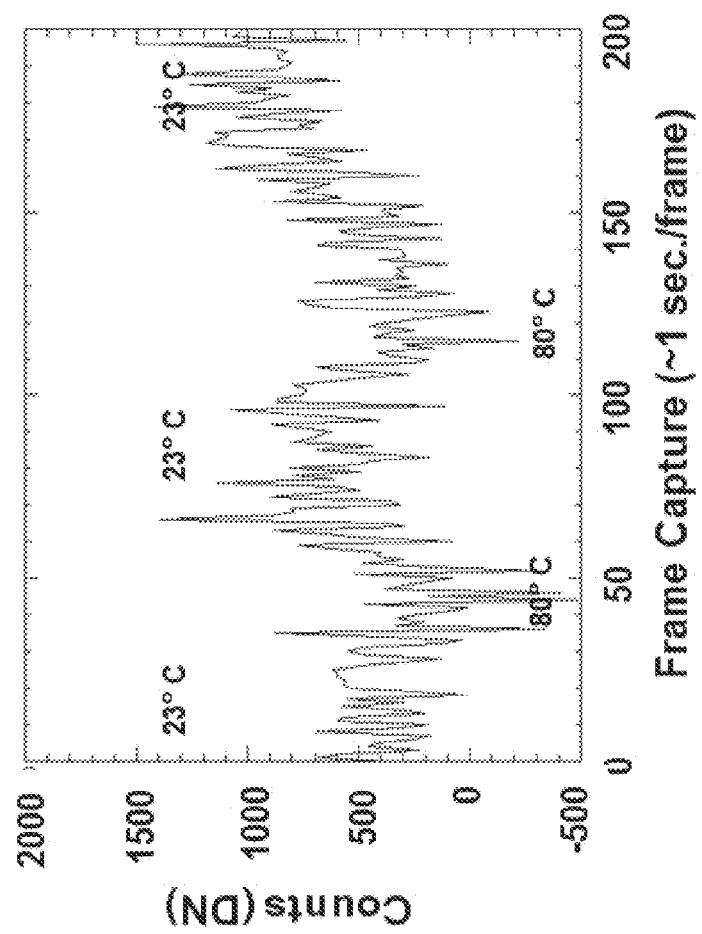
FIG. 14 is a graph of pixel response from blackbody radiation source.

FIGS. 13 and 14 illustrate measurements done on processed device arrays. The first devices were on silicon substrates (instead of fused silica) so the characterization was done in reflection mode (instead of in transmission as shown in FIG. 1A). The test system included an 8- to 12-µm filter that filtered LWIR light from a blackbody source. The filtered light was focused by a ZnSe lens (f/3) and then reflected by a dichroic optic into the dewar and onto the array under test. As determined through modeling, the average LWIR absorption was about 40% in the thermal pixel for the 8- to 12-µm band. A blackbody source provides the IR light, and the Sénarmont method was used to detect the liquid crystal birefringence change due to the absorption of the light. The visible light source is an LED with a wavelength selected somewhere in the visible to optimize the signal and to match the quarter wave plate. The light bandwidth was reduced to about 10 nm by a filter. After going through a beam splitter, the visible light passed through a lens and was focused onto the liquid crystal array. The light reflected by the liquid crystal array was passed again through the lens and focused onto the CCD camera focal plane array.

FIG. 13 a graph of the intensity versus frame capture, again using the heater to step the temperature. The sensitivity is similar to that for the bulk samples, indicating that the array processing does not significantly alter alignment properties or the temperature sensitivity. Achieving sensitivity of the liquid crystal in these small cavities shows that the cavity structure and alignment method does not alter our major premise for designing this array imager. The reflection-mode operation yields a response even though the conditions are very lossy and far from optimum compared to the large-area cell measurements.

FIG. 14 shows the response of a pixel in the array where the frames were taken at less than 1-second intervals. The camera operated at 30 Hz but the frame grabber captured frames about once a second. The measured performance shows detection of temperatures in the tens of degrees centigrade range for the blackbody radiator. The low response with temperature was due to several factors such as the f/3 lens, low thermal resistance (two extra silicon nitride legs), low LWIR absorption, parasitic visible light scattering, and nonoptimum operating conditions.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for detecting incident infrared radiation, the system comprising:
   a liquid crystal transducer comprising liquid crystal material having a birefringence $\Gamma$ that varies as a function of the incident infrared radiation;
   a visible light source, in optical communication with the liquid crystal transducer, to illuminate the liquid crystal transducer with a first beam of linearly polarized visible light so as to produce a beam of elliptically polarized visible light having a degree of ellipticity that varies in proportion to the birefringence of the liquid crystal material, the first beam of linearly polarized light having a polarization angle of 45° with respect to a fast axis of the liquid crystal transducer;
   a quarter-wave plate, in optical communication with the liquid crystal transducer, to convert the beam of elliptically polarized visible light into a second beam of linearly polarized visible light, the quarter-wave plate having an optical axis aligned with the polarization angle of the first beam of linearly polarized light;
   an analyzer, in optical communication with the quarter-wave plate, to polarize the second beam of linearly polarized visible light at an angle based on the birefringence $\Gamma$ of the liquid crystal transducer; and
   a detector array, in optical communication with the analyzer, to produce an electronic representation of the incident infrared radiation in response to detection of the second beam of linearly polarized visible light wherein the analyzer is oriented at an angle based on (i) a change in intensity of the second beam of linearly polarized light as a function of a temperature change of the liquid crystal material induced by the incident infrared radiation and (ii) bend, twist, and/or splay noise associated with propagation of the first beam of linearly polarized light through the liquid crystal material.

2. The system of claim 1, wherein the infrared radiation is within a wavelength range of about 2 μm to about 14 μm.

3. The system of claim 1, wherein the system is configured to operate with a noise equivalent temperature difference (NETD) near room-temperature background limited noise performance (BLIP).

4. The system of claim 1, wherein the liquid crystal transducer comprises:
   a substrate;
   an array of liquid crystal cells, each liquid crystal cell in the array of liquid crystal cells defining a respective sealed cavity containing a respective portion of the liquid crystal material; and
   a plurality of thermal legs, each thermal leg in the plurality of thermal legs in physical contact with the substrate and with a respective liquid crystal cell in the array of liquid crystal cells to support the respective liquid crystal cell and to thermally isolate the respective liquid crystal cell from the substrate.

5. The system of claim 4, wherein at least one respective sealed cavity has a width of about 2 μm to about 25 μm.

6. The system of claim 4, wherein the sealed cavity in at least one liquid crystal cell in the array of liquid crystal cells is at least partially defined by an inorganic layer, the inorganic layer having a textured surface for aligning the liquid crystal material within the at least one liquid crystal cell.

7. The system of claim 1, wherein the analyzer is oriented at an angle based at least in part on a signal-to-noise ratio of the electronic representation of the incident infrared radiation.

8. The system of claim 1, further comprising:
   a lens, in optical communication with the array of liquid crystal cells, to image the incident infrared radiation onto the liquid crystal transducer.

9. A method for thermal imaging of a scene, the method comprising:
   imaging long-wave infrared (LWIR) radiation representative of the scene onto at least one liquid crystal transducer so as to vary a birefringence of the at least one liquid crystal cell by an amount proportional to an intensity of the LWIR radiation;
   illuminating the at least one liquid crystal cell with a first beam of linearly polarized visible light so as to produce a beam of elliptically polarized visible light having a degree of ellipticity that varies by an amount proportional to the birefringence of the at least one liquid crystal cell, the first beam of linearly polarized light having a polarization angle of 45° with respect to a fast axis of the liquid crystal transducer;
   transmitting the beam of elliptically polarized visible light through a quarter-wave plate so as to produce a second beam of linearly polarized visible light having an orientation angle proportional to the birefringence of the at least one liquid crystal cell, the quarter-wave plate having an optical axis aligned with the polarization angle of the first beam of linearly polarized light;
   transmitting the second beam of linearly polarized visible light through a linear polarizer to polarize the second beam of linearly polarized visible at an angle based on the birefringence $\Gamma$ of the liquid crystal transducer; and detecting the second beam of linearly polarized visible light to form an electronic representation of the scene proportional to the intensity of the LWIR radiation, wherein the linear polarizer is oriented at an angle based on (i) a change in intensity of the second beam of linearly polarized light as a function of a temperature change of the at least one liquid crystal cell induced by the LWIR radiation and (ii) bend, twist, and/or splay noise associated with propagation of the first beam of linearly polarized light through the at least one liquid crystal cell.

10. The method of claim 9, wherein transmitting the beam of elliptically polarized visible light through the quarter-wave plate reduces effects of liquid crystal noise.

11. The method of claim 9, wherein transmitting the second beam of linearly polarized visible light through the linear polarizer comprises orienting the linear polarizer at an angle of based on a signal-to-noise ratio of the electronic representation of the scene.

12. A method for thermal imaging of a scene, the method comprising: imaging long-wave infrared (LWIR) radiation representative of the scene onto at least one liquid crystal transducer so as to vary a birefringence of the at least one liquid crystal transducer by an amount proportional to an intensity of the LWIR radiation;

illuminating the at least one liquid crystal transducer with polarized light so as to vary a polarization state of the polarized light by an amount proportional to the birefringence of the at least one liquid crystal transducer;

transmitting the polarized light through a quarter-wave plate so as to transform the polarization state of the polarized light to a linear polarization state having a rotation angle proportional to the birefringence of the at least one liquid crystal transducer;

transmitting the polarized light through a linear polarizer to reduce an amplitude of the polarized light by an amount proportional to the birefringence of the at least one liquid crystal transducer; and detecting the polarized light transmitted through the linear polarizer to form a representation of the scene proportional to the intensity of the LWIR radiation, wherein the linear polarizer is oriented at an angle based on (i) a change in intensity of the polarized light as a function of a temperature change of the liquid crystal transducer induced by the LWIR radiation and (ii) bend, twist, and/or splay noise associated with propagation of the polarized light through the liquid crystal transducer.

* * * * *